United States Patent
Uno

(10) Patent No.: US 10,782,592 B2
(45) Date of Patent: Sep. 22, 2020

(54) IMAGING DEVICE

(71) Applicant: SONY CORPORATION, Tokyo (JP)

(72) Inventor: Taiki Uno, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/342,457

(22) PCT Filed: Oct. 13, 2017

(86) PCT No.: PCT/JP2017/037204
§ 371 (c)(1),
(2) Date: Apr. 16, 2019

(87) PCT Pub. No.: WO2018/110063
PCT Pub. Date: Jun. 21, 2018

(65) Prior Publication Data
US 2020/0050079 A1 Feb. 13, 2020

(30) Foreign Application Priority Data
Dec. 15, 2016 (JP) .................... 2016-243683

(51) Int. Cl.
G03B 11/04 (2006.01)
G03B 17/14 (2006.01)

(52) U.S. Cl.
CPC ............ *G03B 11/043* (2013.01); *G03B 17/14* (2013.01)

(58) Field of Classification Search
CPC .......................... G03B 11/043; G03B 11/048
See application file for complete search history.

(56) References Cited

U.S. PATENT DOCUMENTS 7,657,174 B2 * 2/2010 Arai ..................... G03B 17/14
348/211.14
2008/0002968 A1 1/2008 Arai

FOREIGN PATENT DOCUMENTS

| JP | 02157834 A | * | 6/1990 |
|----|------------|---|--------|
| JP | 11-295797 A | | 10/1999 |
| JP | 2000-241869 A | | 9/2000 |
| JP | 2007-139849 A | | 6/2007 |
| JP | 2007-183483 A | | 7/2007 |
| JP | 2008-015017 A | | 1/2008 |
| JP | 2011-013399 A | | 1/2011 |

OTHER PUBLICATIONS

International Search Report and Written Opinion of PCT Application No. PCT/JP2017/037204, dated Dec. 26, 2017, 08 pages of ISRWO.

* cited by examiner

Primary Examiner — Clayton E. LaBalle
Assistant Examiner — Leon W Rhodes, Jr.
(74) Attorney, Agent, or Firm — Chip Law Group

(57) ABSTRACT

To improve usability. An annular mounting portion to which an accessory is attachable, an imaging element that receives object light taken through an opening, a barrier moved between a closing position for closing the opening and an opening position for opening the opening, a portion to be acted that moves the barrier with an attaching action of the accessory to the mounting portion, and an operation portion that moves the barrier regardless of the attaching action of the accessory to the mounting portion are provided, and the operation portion is located inside the mounting portion or at a front portion of the mounting portion.

19 Claims, 37 Drawing Sheets

IMAGING DEVICE

CROSS REFERENCE TO RELATED APPLICATIONS

This application is a U.S. National Phase of International Patent Application No. PCT/JP2017/037204 filed on Oct. 13, 2017, which claims priority benefit of Japanese Patent Application No. JP 2016-243683 filed in the Japan Patent Office on Dec. 15, 2016. Each of the above-referenced applications is hereby incorporated herein by reference in its entirety.

TECHNICAL FIELD

The present technology relates to a technical field regarding an imaging device in which an accessory is attachable and detachable with respect to a mounting portion.

BACKGROUND ART

In various imaging devices such as still cameras and video cameras, accessories such as interchangeable lenses are made attachable and detachable with respect to an annular mounting portion, and for example, the interchangeable lens is attached to the mounting portion, whereby the functionality is improved. Furthermore, the interchangeable lens is attached to the mounting portion via an adapter in some cases, and the adapter is also used as an accessory for the imaging device.

In such imaging devices to which accessories are made attachable and detachable, there is an imaging device having a configuration in which an accessory provided with a coupling portion is rotated with respect to a mounting portion provided with an engaging portion in a state where the accessory is pressed against the mounting portion to engage the coupling portion of the accessory with the engaging portion of the mounting portion, so that the accessory is attached to the mounting portion (for example, see Patent Document 1).

Removal of the accessory from the imaging device can be performed by rotating the accessory in a reverse direction to the attachment time with respect to the mounting portion to disengage the coupling portion from the engaging portion, and taking out the accessory from the mounting portion.

In the imaging device as described above, an imaging element into which capture light enters is arranged, and an opening for taking in the capture light into the mounting portion is formed, and a barrier (cover) capable of opening and closing the opening to suppress intrusion of foreign matters such as dust, moisture, and the like through the opening is provided.

The barrier has a function to open and close the opening for taking in the capture light as described above. The barrier opens the opening at the time of capture and closes the opening at the time of non-capture. Furthermore, for example, in a case of performing cleaning to remove the dust and the like adhering to the imaging element with cloth or the like, the opening needs to be opened by the barrier.

Therefore, the imaging device described in Patent Document 1 is provided with a changeover switch. The changeover switch is arranged outside the mounting portion.

When an automatic mode is set by an operation for the changeover switch, the barrier is moved with attachment or detachment of the accessory with respect to the mounting portion, and the opening is opened by the barrier when the accessory is attached to the mounting portion and the opening is closed by the barrier when the accessory is detached from the mounting portion. Meanwhile, when a manual mode (open mode or close mode) is set by an operation for the changeover switch, the opening can be manually opened or closed by the barrier regardless of attachment or detachment of the accessory with respect to the mounting portion.

CITATION LIST

Patent Document

Patent Document 1: Japanese Patent Application Laid-Open No. 2008-15017

SUMMARY OF THE INVENTION

Problems to be Solved by the Invention

By the way, with the provision of the changeover switch for switching the automatic mode and the manual mode, the barrier is moved to open or close the opening according to intention or use of a user, and therefore, usability of the imaging device can be improved and loss of capture opportunities can be decreased.

On the other hand, with the existence of the changeover switch, there are possibilities that a finger touches the changeover switch, causing a sense of discomfort, when the user holds the imaging device at the time of capture, or the like, or the user unintentionally touches the changeover switch to perform an erroneous operation, for example.

Therefore, the imaging device according to the present technology has overcome the above-described problems and an objective is to improve the usability.

Solutions to Problems

First, an imaging device according to the present technology includes an annular mounting portion to which an accessory is attachable, an imaging element that receives object light taken through an opening, a barrier moved between a closing position for closing the opening and an opening position for opening the opening, a portion to be acted that moves the barrier with an attaching action of the accessory to the mounting portion, and an operation portion that moves the barrier regardless of the attaching action of the accessory to the mounting portion, and the operation portion is located inside the mounting portion or at a front portion of the mounting portion.

With the configuration, the barrier is moved between the closing position and the opening position by an operation for the operation portion located inside the mounting portion or at the front portion of the mounting portion to open or close the opening.

Second, in the imaging device according the above-described present technology, it is desirable that a restriction portion that restricts an operation of the operation portion to disable the movement of the barrier is provided.

With the configuration, the barrier is held at a predetermined position by the restriction of the operation of the operation portion by the restriction portion. Therefore, the barrier is not unintentionally moved between the opening position and the closing position.

Third, in the imaging device according the above-described present technology, it is desirable that the barrier is held at the opening position by the restriction of the operation of the operation portion by the restriction portion.

With the configuration, the barrier is held at the opening position by the restriction of the operation of the operation portion by the restriction portion. Therefore, the barrier is not unintentionally moved from the opening position to the closing position.

Fourth, in the imaging device according the above-described present technology, it is desirable that an actuation lever including the portion to be acted and moved with the attaching action of the accessory is provided.

With the configuration, the actuation lever is moved with the attaching action of the accessory and the portion to be acted is moved.

Fifth, in the imaging device according the above-described present technology, it is desirable that a support base that movably supports the actuation lever is provided, a restriction portion that restricts an operation of the operation portion to disable the movement of the barrier is provided, and the restriction portion is provided in the support base.

With the configuration, the restriction portion is provided in the support base that movably supports the actuation lever. Therefore, special parts for providing the restriction portion are not necessary.

Sixth, in the imaging device according the above-described present technology, it is desirable that the operation portion exists at a position not in contact with the accessory at time of attachment or detachment of the accessory with respect to the mounting portion.

With the configuration, the operation portion is not operated by the accessory at the attachment or detachment of the accessory with respect to the mounting portion.

Seventh, in the imaging device according the above-described present technology, it is desirable that an operation lever including the operation portion is provided, and the operation lever is supported by the actuation lever.

With the configuration, the actuation lever and the operation lever do not exist at separated positions. Therefore, a total arrangement space of the actuation lever and the operation lever becomes small.

Eighth, another imaging device according to the present technology includes an annular mounting portion to which an accessory is attachable, an imaging element that receives object light taken through an opening, a barrier moved between a closing position for closing the opening and an opening position for opening the opening, an operation portion that moves the barrier regardless of an attaching action of the accessory to the mounting portion, and a restriction portion that restricts an operation of the operation portion to disable the movement of the barrier, and the operation portion is located inside the mounting portion or at a front portion of the mounting portion.

With the configuration, the barrier is moved between the closing position and the opening position by an operation for the operation portion located inside the mounting portion or at the front portion of the mounting portion to open or close the opening.

Ninth, in the another imaging element according to the above-described present technology, it is desirable that a portion to be acted that moves the barrier with the attaching action of the accessory to the mounting portion is provided.

With the configuration, the portion to be acted is moved when the accessory is attached or detached with respect to the mounting portion and the barrier is moved between the opening position and the closing position to open or close the opening. Therefore, it is not necessary to separately perform attaching and detaching work of the accessory and opening and closing work of the opening.

Tenth, in the another imaging element according to the above-described present technology, it is desirable that an actuation lever including the portion to be acted and moved with the attaching action of the accessory is provided.

With the configuration, the actuation lever is moved with the attaching action of the accessory and the portion to be acted is moved.

Eleventh, in the another imaging element according to the above-described present technology, it is desirable that a support base that movably supports the actuation lever is provided, and the restriction portion is provided in the support base.

With the configuration, the restriction portion is provided in the support base that movably supports the actuation lever. Therefore, special parts for providing the restriction portion are not necessary.

Twelfth, in the another imaging element according to the above-described present technology, it is desirable that an operation lever including the operation portion is provided, and the operation lever is supported by the actuation lever.

With the configuration, the actuation lever and the operation lever do not exist at separated positions. Therefore, a total arrangement space of the actuation lever and the operation lever becomes small.

Thirteenth, in the another imaging element according to the above-described present technology, it is desirable that the barrier is held at the opening position by the restriction of the operation of the operation portion by the restriction portion.

With the configuration, the barrier is held at the opening position by the restriction of the operation of the operation portion by the restriction portion. Therefore, the barrier is not unintentionally moved from the opening position to the closing position.

Fourteenth, in the another imaging element according to the above-described present technology, it is desirable that the operation portion exists at a position not in contact with the accessory at time of attachment or detachment of the accessory with respect to the mounting portion.

With the configuration, the operation portion is not operated by the accessory at the attachment or detachment of the accessory with respect to the mounting portion.

Fifteenth, a still another imaging device according to the present technology includes an annular mounting portion to which an accessory is attachable, an imaging element that receives object light taken through an opening, a barrier moved between a closing position for closing the opening and an opening position for opening the opening, and an operation portion that moves the barrier regardless of an attaching action of the accessory to the mounting portion, and the operation portion is located inside the mounting portion or at a front portion of the mounting portion at a position not in contact with the accessory at time of attachment or detachment of the accessory with respect to the mounting portion.

With the configuration, the barrier is moved between the closing position and the opening position by an operation for the operation portion located inside the mounting portion or at the front portion of the mounting portion to open or close the opening.

Sixteenth, in the still another imaging device according to the above-described present technology, it is desirable that a restriction portion that restricts an operation of the operation portion to disable the movement of the barrier is provided.

With the configuration, the barrier is held at a predetermined position by the restriction of the operation of the operation portion by the restriction portion. Therefore, the barrier is not unintentionally moved between the opening position and the closing position.

Seventeenth, in the still another imaging device according to the above-described present technology, it is desirable that the barrier is held at the opening position by the restriction of the operation of the operation portion by the restriction portion.

With the configuration, the barrier is held at the opening position by the restriction of the operation of the operation portion by the restriction portion. Therefore, the barrier is not unintentionally moved from the opening position to the closing position.

Eighteenth, in the still another imaging device according to the above-described present technology, it is desirable that a portion to be acted that moves the barrier with the attaching action of the accessory to the mounting portion is provided.

With the configuration, the portion to be acted is moved when the accessory is attached or detached with respect to the mounting portion and the barrier is moved between the opening position and the closing position to open or close the opening. Therefore, it is not necessary to separately perform attaching and detaching work of the accessory and opening and closing work of the opening.

Nineteenth, in the still another imaging device according to the above-described present technology, it is desirable that an actuation lever including the portion to be acted and moved with the attaching action of the accessory is provided.

With the configuration, the actuation lever is moved with the attaching action of the accessory and the portion to be acted is moved.

Twentieth, in the still another imaging device according to the above-described present technology, it is desirable that a restriction portion that restricts an operation of the operation portion to disable the movement of the barrier is provided, a support base that movably supports the actuation lever is provided, and the restriction portion is provided in the support base.

With the configuration, the restriction portion is provided in the support base that movably supports the actuation lever. Therefore, special parts for providing the restriction portion are not necessary.

Twenty first, in the still another imaging device according to the above-described present technology, it is desirable that an operation lever including the operation portion is provided, and the operation lever is supported by the actuation lever.

With the configuration, the actuation lever and the operation lever do not exist at separated positions. Therefore, a total arrangement space of the actuation lever and the operation lever becomes small.

Effects of the Invention

According to the present technology, the barrier is moved between the closing position and the opening position by the operation for the operation portion located inside the mounting portion or at the front portion of the mounting portion to open or close the opening. Therefore, the finger is less likely to touch the operation portion in the state of gripping the imaging device, and the usability can be improved.

Note that the effects described in the present specification are merely examples and are not limited, and other effects may be exhibited.

MODE FOR CARRYING OUT THE INVENTION

Hereinafter, modes for implementing the present technology will be described with reference to the accompanying drawings.

In an embodiment described below, an imaging device of the present technology is applied to a still camera.

Note that the scope of application of the present technology is not limited to still cameras. The present technology can be widely applied to various other imaging devices such as video cameras other than still cameras, for example.

In the following description, it is assumed that front-rear, up-down, and right-left directions are indicated according to a direction viewed from a photographer. Therefore, an object side is a front side and an image surface side is a rear side.

Note that the front-rear, up-down, and right-left directions described below are for convenience of description, and implementation of the present technology is not limited to these directions.

Furthermore, a lens group described below may include a group including a single lens or a plurality of lenses and a group including other optical elements such as a diaphragm and an iris in addition to the single lens or the plurality of lenses.

Moreover, hereinafter, an interchangeable lens will be described as an example of an accessory attachable and detachable with respect to an imaging device. However, the accessory is not limited to the interchangeable lens and may be, for example, another accessory such as an adapter for attaching the interchangeable lens to the imaging device.

<Schematic Configuration of Imaging Device>

First, a schematic configuration of an imaging device will be described (see FIGS. 1 to 6).

Figure 1:
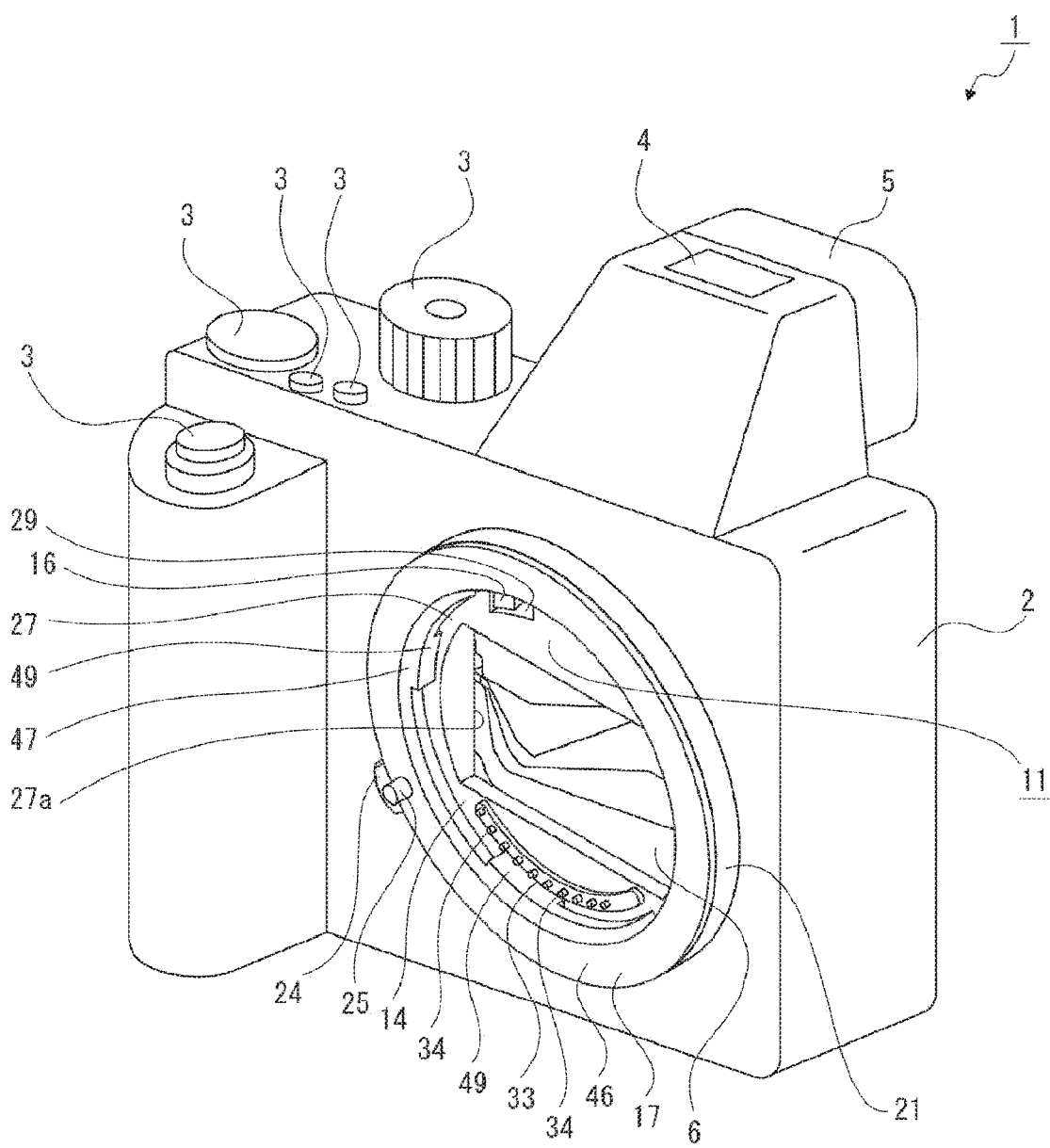
FIG. 1 illustrates an embodiment of an imaging device according to the present technology together with FIGS. 2 to 43, and is a perspective view illustrating the imaging device.
Figure 2:
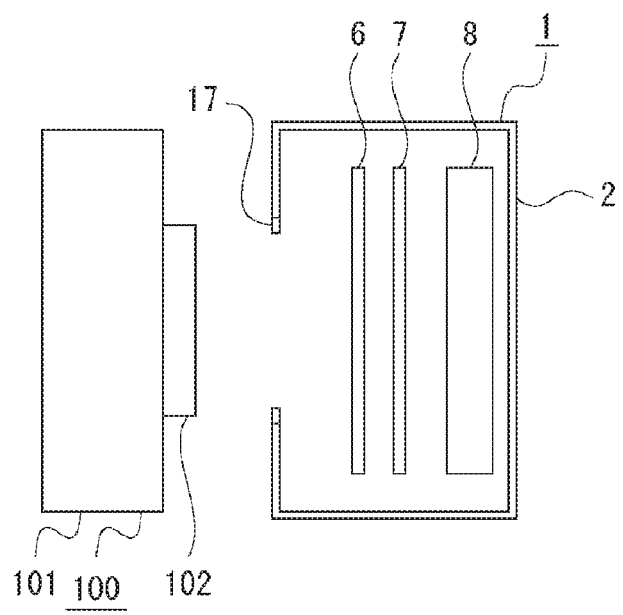
FIG. 2 is a cross-sectional view illustrating an example of an internal configuration of the imaging device and an interchangeable lens.
Figure 3:
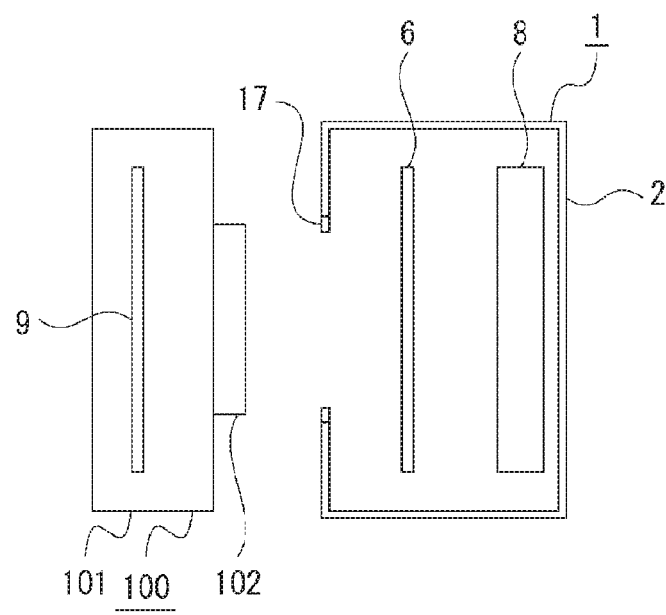
FIG. 3 is a cross-sectional view illustrating another example of the internal configuration of the imaging device and the interchangeable lens.
Figure 4:
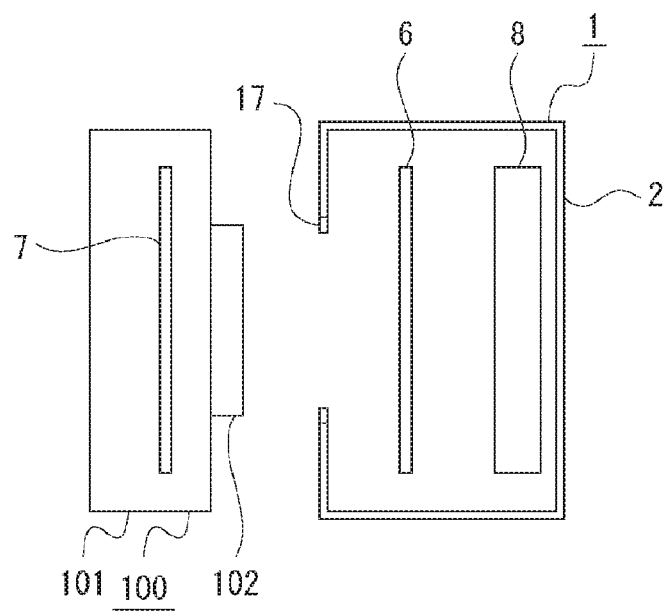
FIG. 4 is a cross-sectional view illustrating still another example of the internal configuration of the imaging device and the interchangeable lens.
Figure 5:
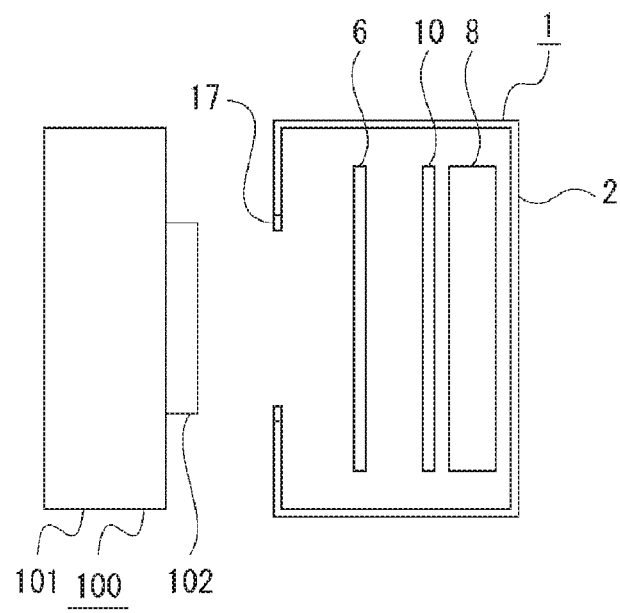
FIG. 5 is a cross-sectional view illustrating still another example of the internal configuration of the imaging device and the interchangeable lens.
Figure 6:
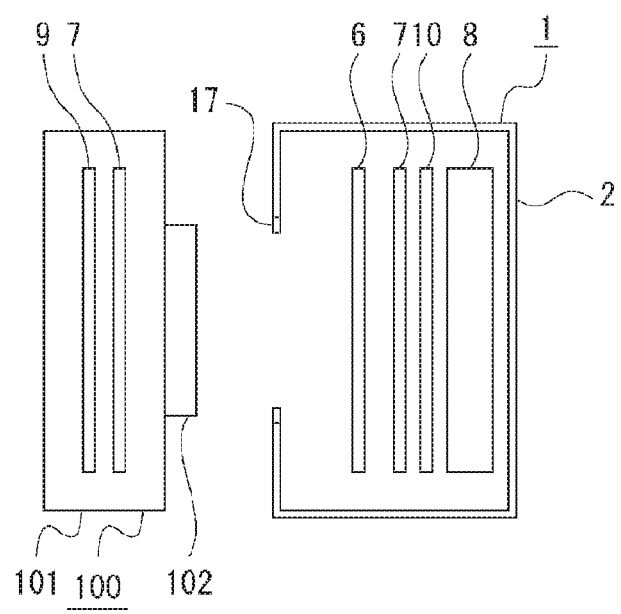
FIG. 6 is a cross-sectional view illustrating still another example of the internal configuration of the imaging device and the interchangeable lens.

An imaging device 1 is configured such that, for example, required parts are arranged inside and outside a casing 2 that is flat and long in a cross direction (see FIGS. 1 and 2). An interchangeable lens 100 used as an accessory is made attachable to and detachable from the imaging device 1.

Various input units 3, 3, and the like are provided on an upper surface of the casing 2 (see FIG. 1). As the input units 3, 3, and the like, a capture button, a zoom knob, a power button, a mode selection knob, and the like are provided, for example. A retractable flash 4 is provided on an upper end portion of the casing 2. A finder 5 is provided behind the flash 4 at the upper end portion of the casing 2. A display (not illustrated) and various operation units (not illustrated) are provided on a rear surface of the casing 2.

A barrier 6, a shutter 7, and an imaging element 8 are arranged inside the casing 2 in order from the front side (see FIG. 2). As the imaging element 8, a charge coupled device (CCD), a complementary metal-oxide semiconductor (CMOS), or the like is used, for example.

Note that the imaging device 1 may have a configuration in which the barrier 6 and the imaging element 8 are arranged inside the casing 2 in order from the front side and the shutter 7 is not arranged (see FIGS. 3 and 4), for example. In this case, the imaging device 1 may have a configuration in which a diaphragm 9 is arranged inside the interchangeable lens 100 (see FIG. 3) or a configuration in which the shutter 7 is arranged inside the interchangeable lens 100 (see FIG. 4), for example.

Furthermore, the imaging device 1 may have a configuration in which the barrier 6, a mirror (reflector) 10, and the imaging element 8 are arranged inside the casing 2 in order from the front side and the shutter 7 is not arranged (see FIG. 5), for example. In this case, the imaging device 1 may have a configuration in which the shutter 7 and the diaphragm 9 are not arranged inside the interchangeable lens 100, for example.

Moreover, the imaging device 1 may have a configuration in which the barrier 6, the shutter 7, the mirror 10, and the imaging element 8 are arranged inside the casing 2 in order from the front side (see FIG. 6), for example. In this case, the imaging device 1 may have a configuration in which the diaphragm 9 and the shutter 7 are arranged inside the interchangeable lens 100, for example.

<Specific Configuration of Imaging Device>

Next, a specific configuration of the imaging device will be described.

Figure 7:
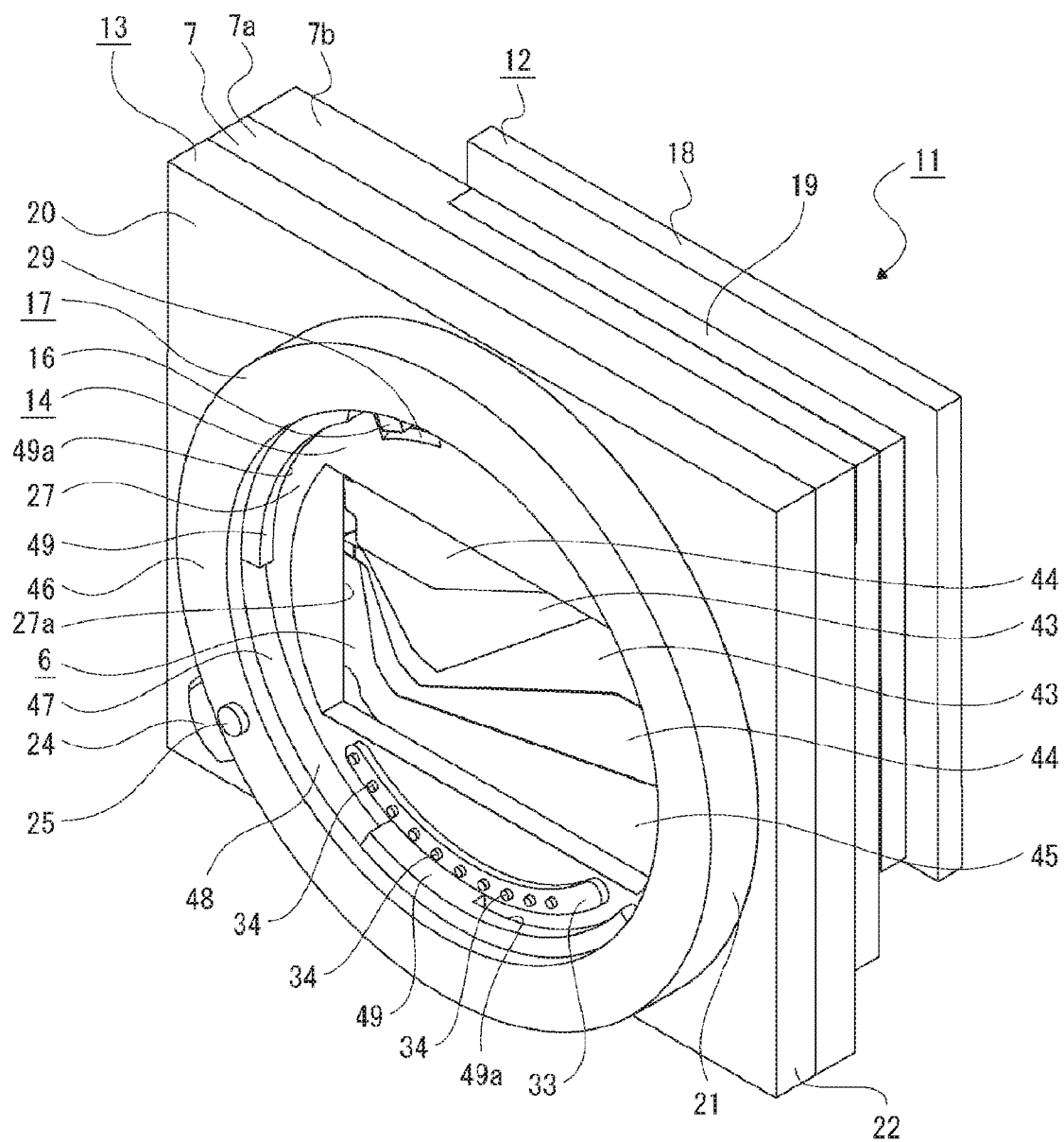
FIG. 7 is a perspective view of a camera unit.
Figure 8:
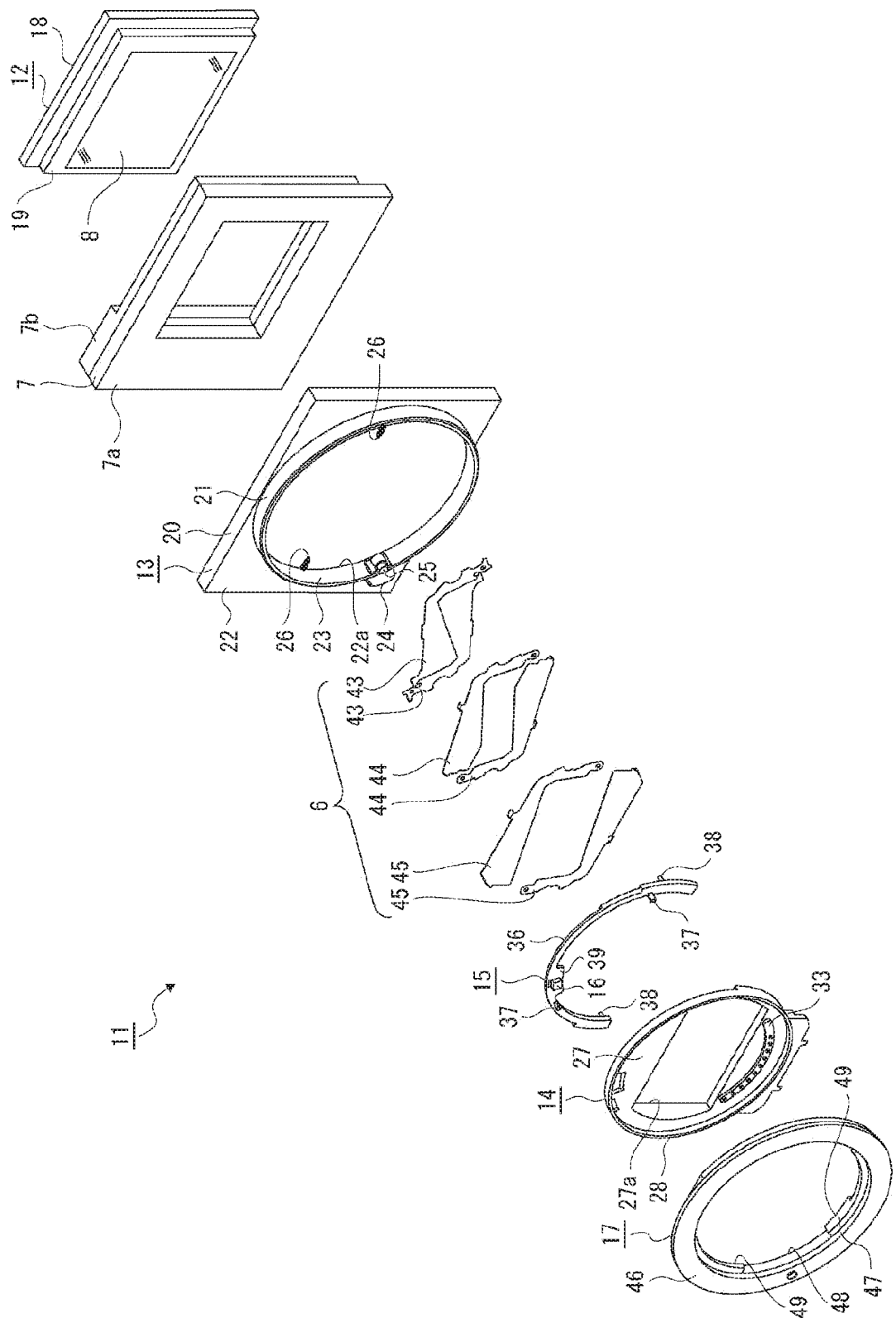
FIG. 8 is an exploded perspective view of the camera unit.

The imaging device 1 is provided with a camera unit 11 attached to the casing 2 (see FIGS. 1, 7, and 8). A circular arrangement hole is formed in a front portion of the casing 2, and the camera unit 11 is attached to the casing 2 in a state where a part of the camera unit 11 projects forward through the arrangement hole.

The camera unit 11 includes an imaging unit 12, the shutter 7, a base body 13, a support base 14, an actuation lever 15, an operation lever 16, the barrier 6, and a mounting portion 17 (see FIGS. 7 and 8).

The imaging unit 12 includes a substantially flat plate-like unit base 18 facing the front-rear direction, an element holder 19 attached to a front surface of the unit base 18, and the imaging element 8 held by the element holder 19. Capture light enters the imaging element 8, and the incident capture light is converted into an electrical signal by photoelectric conversion.

The shutter 7 includes a substantially flat plate-like support body 7a facing the front-rear direction and a mechanism portion 7b attached to a rear surface of the support body 7a. The mechanism portion 7b has a plurality of shutter blades (not illustrated). The shutter blades are moved when the capture button is operated. The shutter 7 is attached to the imaging unit 12 from the front side, and the shutter blades are moved on the front side of the imaging element 8.

Figure 9:
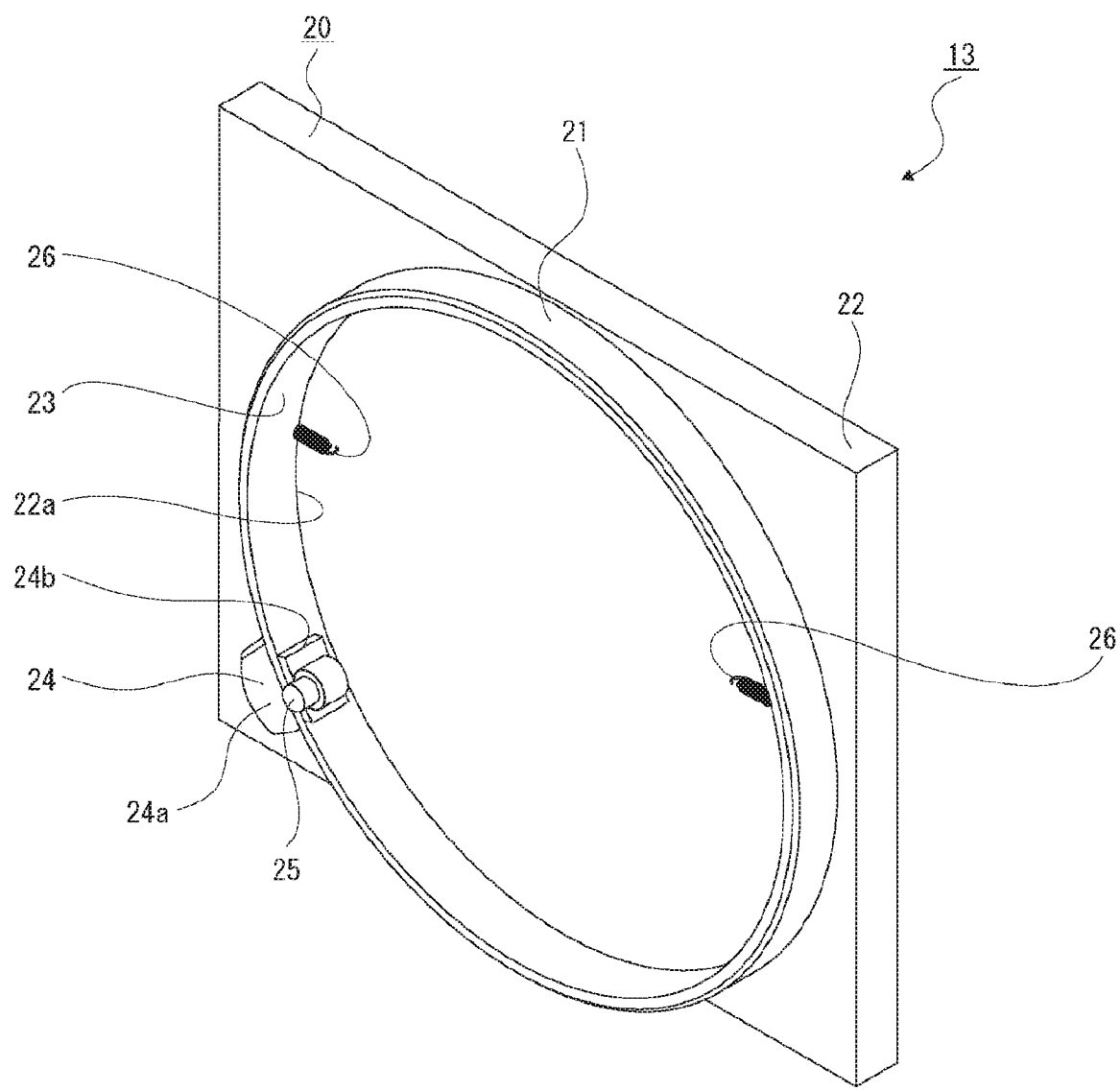
FIG. 9 is a perspective view of a base body.

The base body 13 includes a base member 20 arranged facing a front surface of the support body 7a of the shutter 7 and a decorative ring 21 attached to the base member 20 (see FIG. 9).

The base member 20 includes a plate-like substrate portion 22 facing the front-rear direction and a substantially annular annular portion 23 projecting forward from the substrate portion 22.

A circular light transmission hole 22a penetrating in the front-rear direction is formed in the substrate portion 22. The annular portion 23 projects forward from an opening edge of the light transmission hole 22a. An insertion hole (not illustrated) is formed in the annular portion 23.

A release button 24 is movably supported in the front-rear direction by the substrate portion 22. The release button 24 has a portion to be pressed 24a and a substantially L-shaped linking portion 24b projecting from the portion to be pressed 24a. The portion to be pressed 24a is located on an outer peripheral surface side of the annular portion 23, and the linking portion 24b is inserted through the insertion hole formed in the annular portion 23 and a tip end is located on an inner peripheral surface side of the annular portion 23. The release button 24 has a configuration in which the portion to be pressed 24a is pressed rearward and is moved forward and returns to an original state by a spring member (not illustrated) when the pressing operation is completed.

A round shaft-like insertion pin 25 is attached to the tip end of the linking portion 24b of the release button 24. The insertion pin 25 has an axial direction in the front-rear direction and is moved in the front-rear direction with the movement in the front-rear direction of the release button 24.

The decorative ring 21 is attached to the outer peripheral surface of the annular portion 23.

Biasing springs 26 and 26 are connected to an inner peripheral portion of the substrate portion 22 in the base member 20. The biasing springs 26 and 26 are, for example, tension coil springs and are connected to positions separated by approximately 180 degrees in a circumferential direction of the annular portion 23.

Figure 10:
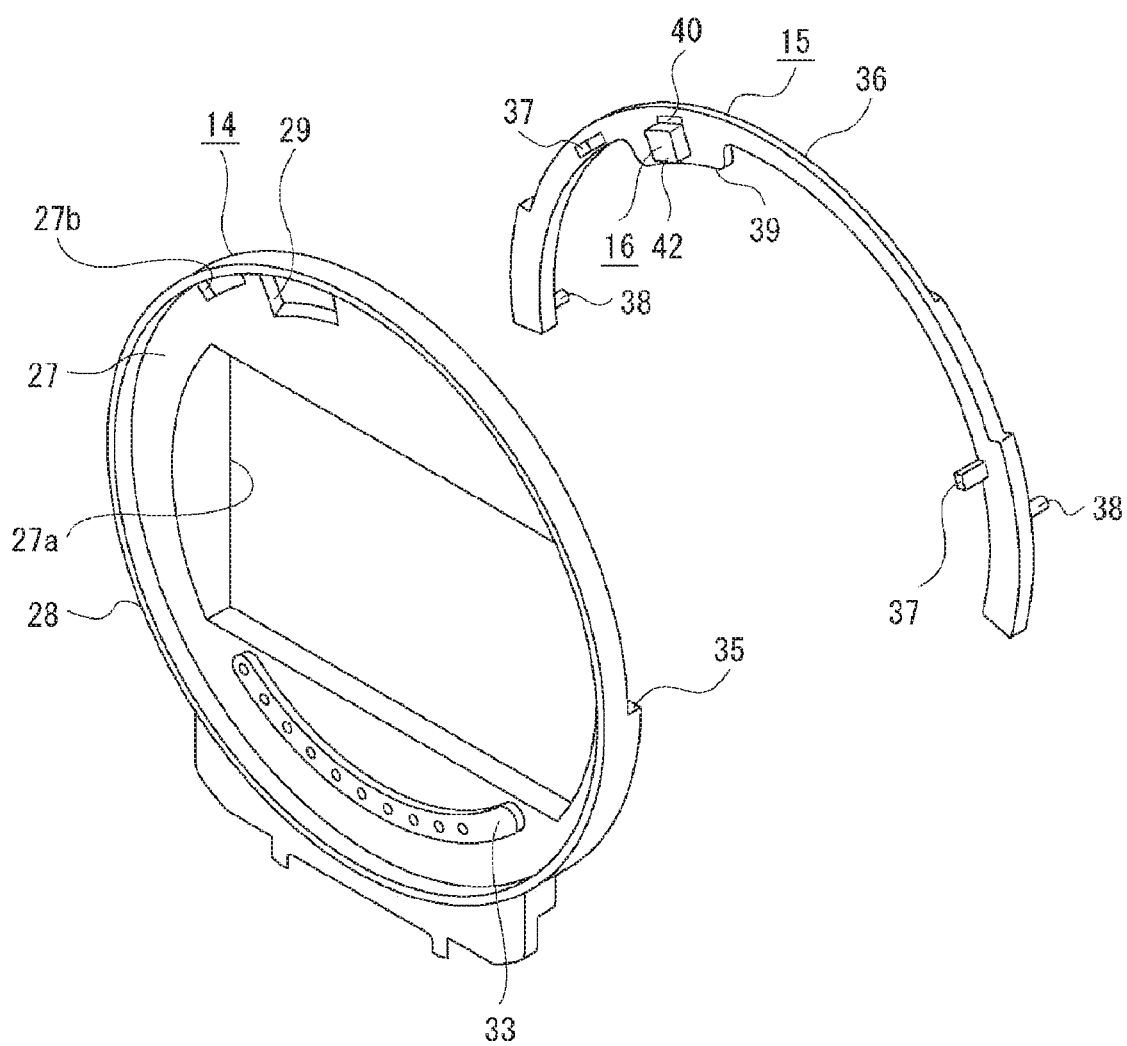
FIG. 10 is an exploded perspective view illustrating a support base, an actuation lever, and an operation lever.
Figure 11:
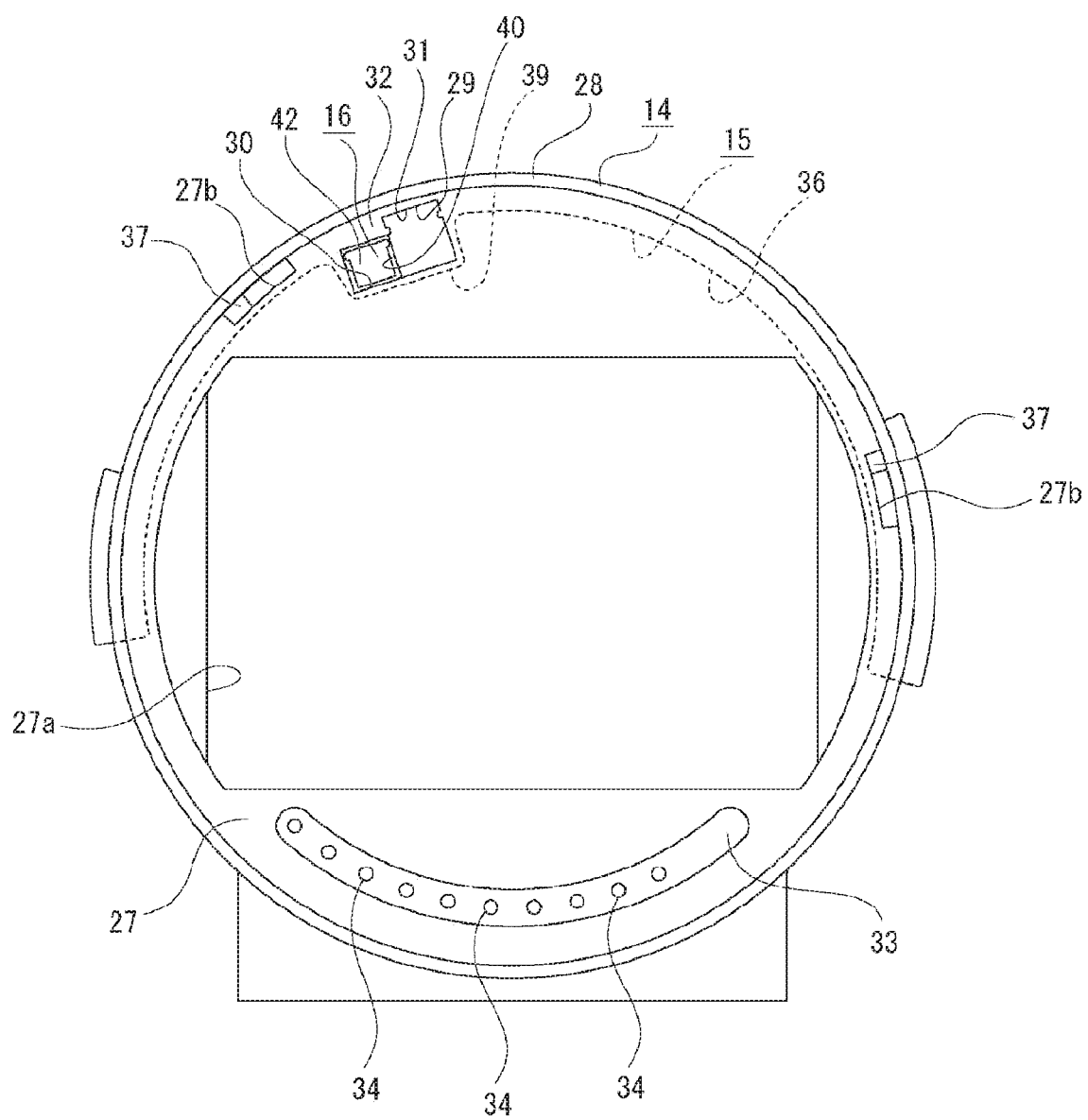
FIG. 11 is a front view illustrating a state in which the actuation lever is supported by the support base.
Figure 12:
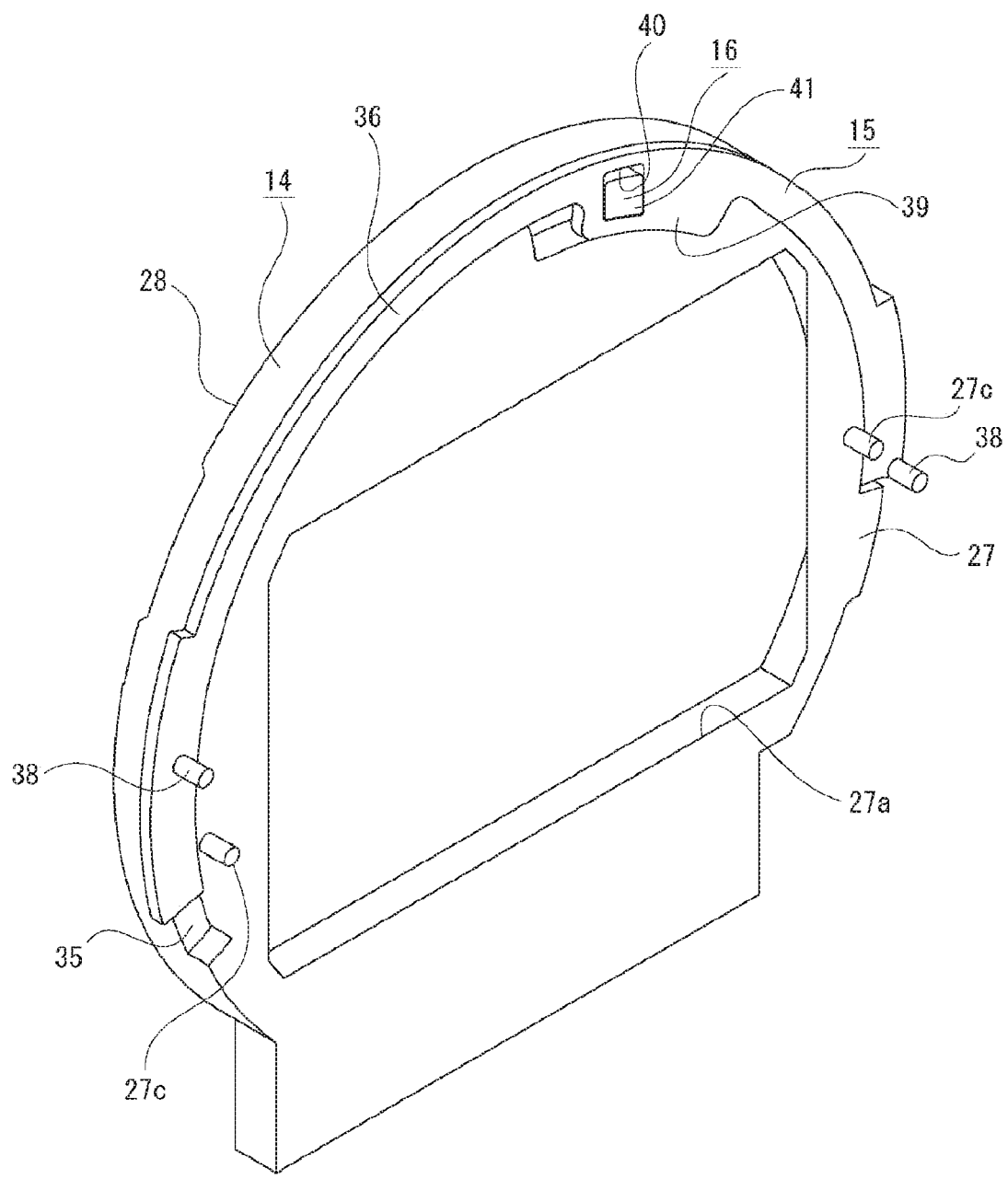
FIG. 12 is a perspective view illustrating the state in which the actuation lever is supported by the support base.

The support base 14 includes a substantially flat plate-like support surface portion 27 facing the front-rear direction and an annular flange portion 28 projecting forward from the support surface portion 27 (see FIGS. 10 to 12). The support base 14 is arranged between the base body 13 and the shutter 7.

The support surface portion 27 is formed in a circular shape in outer shape excluding a lower end portion, and has an opening 27a that is long in the cross direction and having a substantially rectangular shape. The opening 27a is a space for taking in the capture light entering the imaging element 8. Projection insertion holes 27b and 27b are formed apart in the circumferential direction in an outer peripheral portion of the support surface portion 27. The projection insertion holes 27b and 27b are formed in an arc shape extending in the circumferential direction.

A action hole 29 is formed between the projection insertion holes 27b and 27b in the outer peripheral portion of the support surface portion 27. The action hole 29 is formed in a shape extending in the circumferential direction, and one substantially half portion in the circumferential direction is formed as a first portion 30 and the other substantially half portion is formed as a second portion 31 (see FIG. 13). The second portion 31 is formed larger on the flange portion 28 side than the first portion 30, and a portion continuing to the first portion 30 in the circumferential direction is formed as an non-lock space 31a, and a portion on the flange portion 28 side with respect to the non-lock space 31a is formed as a lock space 31b.

One portion of the support surface portion 27, the one portion being adjacent to the lock space 31b in the circumferential direction, is provided as a restriction portion 32.

A contact placement portion 33 is provided at a position near a lower end of the support surface portion 27 (see FIGS. 10 and 11). The contact placement portion 33 is formed in an arc shape curving downward, and a plurality of contacts 34, 34, and the like is arranged apart in the circumferential direction in the contact placement portion 33.

A support recess 35 is formed in the outer peripheral portion on the rear surface side of the support surface portion (see FIG. 12). The support recess 35 is formed in a substantially arc shape and is opened rearward and outward. Support shaft portions 27c and 27c projecting rearward are provided at positions separated by approximately 180 degrees in the circumferential direction on the support surface portion 27.

The actuation lever 15 is movably supported in the circumferential direction in a state of being inserted in the support recess 35 by the support surface portion 27 (see FIGS. 10 to 12). The actuation lever 15 has a sliding portion 36 formed in a substantially arc shape, portions of action 37 and 37 projecting forward from a rear surface of the sliding portion 36, and pressing projections 38 and 38 projecting rearward from a back surface of the sliding portion 36.

The sliding portion 36 is formed in a substantially arc shape that is slightly shorter than a circumferential length of the support recess 35 and is provided with a lever support portion 39 having a wider width than other portions in a middle portion in the circumferential direction. The lever support portion 39 is provided with a portion projecting inward with respect to other portions.

Figure 14:
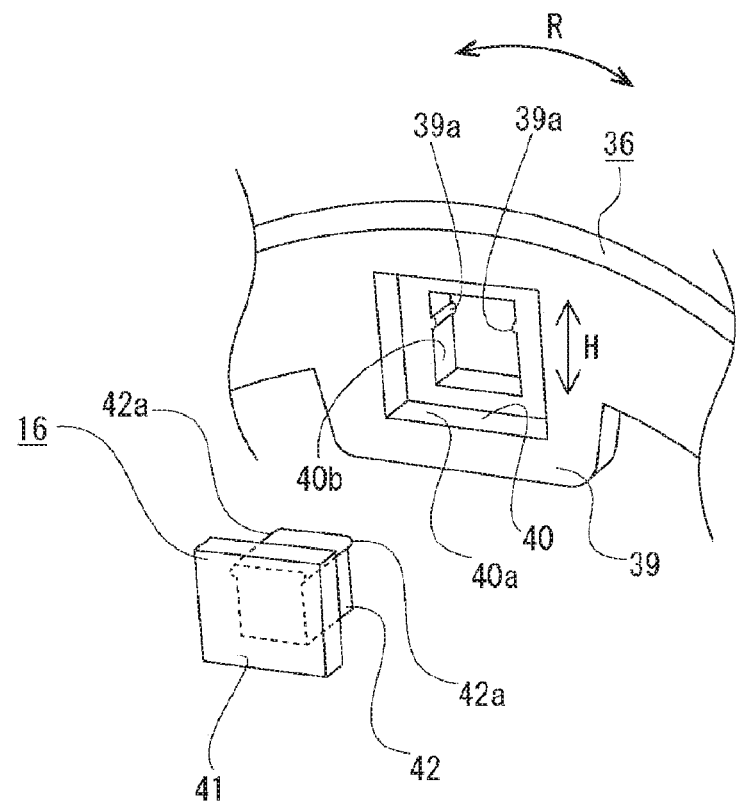
FIG. 14 is an exploded perspective view of a part of the actuation lever and the operation lever.
Figure 15:
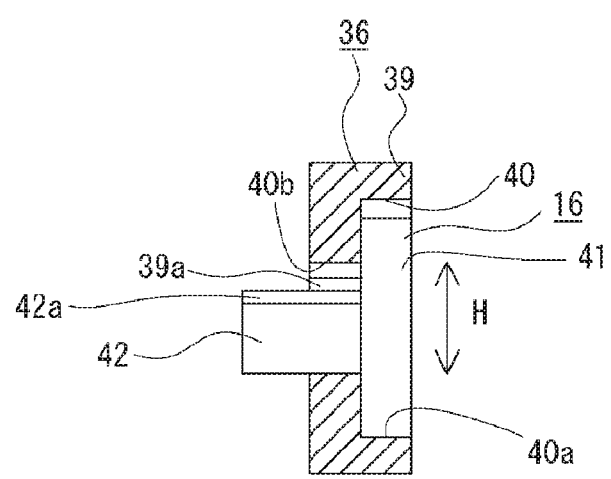
FIG. 15 is a side view illustrating a part of the actuation lever and the operation lever in cross section.

An arrangement hole 40 is formed in the lever support portion 39 (see FIGS. 14 and 15). The arrangement hole 40 has two portions having different outer sizes, which are an arrangement portion 40a formed on a rear surface side of the lever support portion 39 and an insertion portion 40b formed on a front surface side of the lever support portion 39. The arrangement portion 40a is slightly larger than the insertion portion 40b.

The lever support portion 39 is provided with substantially semicylindrical restriction projections 39a and 39a at an opening edge of the insertion portion 40b in the arrangement hole 40, the restriction projections 39a and 39a projecting in directions approaching each other. The restriction projections 39a and 39a are provided at positions close to an outer periphery of the sliding portion 36 at the opening edge of the insertion portion 40b.

The portions of action 37 and 37 and the pressing projections 38 and 38 are each located apart from each other in the circumferential direction (see FIGS. 10 and 12).

In a state where the actuation lever 15 is supported by the support surface portion 27, the substantially entire sliding portion 36 is inserted into the support recess 35 of the support base 14, and the portions of action 37 and 37 are respectively inserted from the rear into the projection insertion holes 27b and 27b of the support base 14 (see FIGS. 11 and 12).

Figure 13:
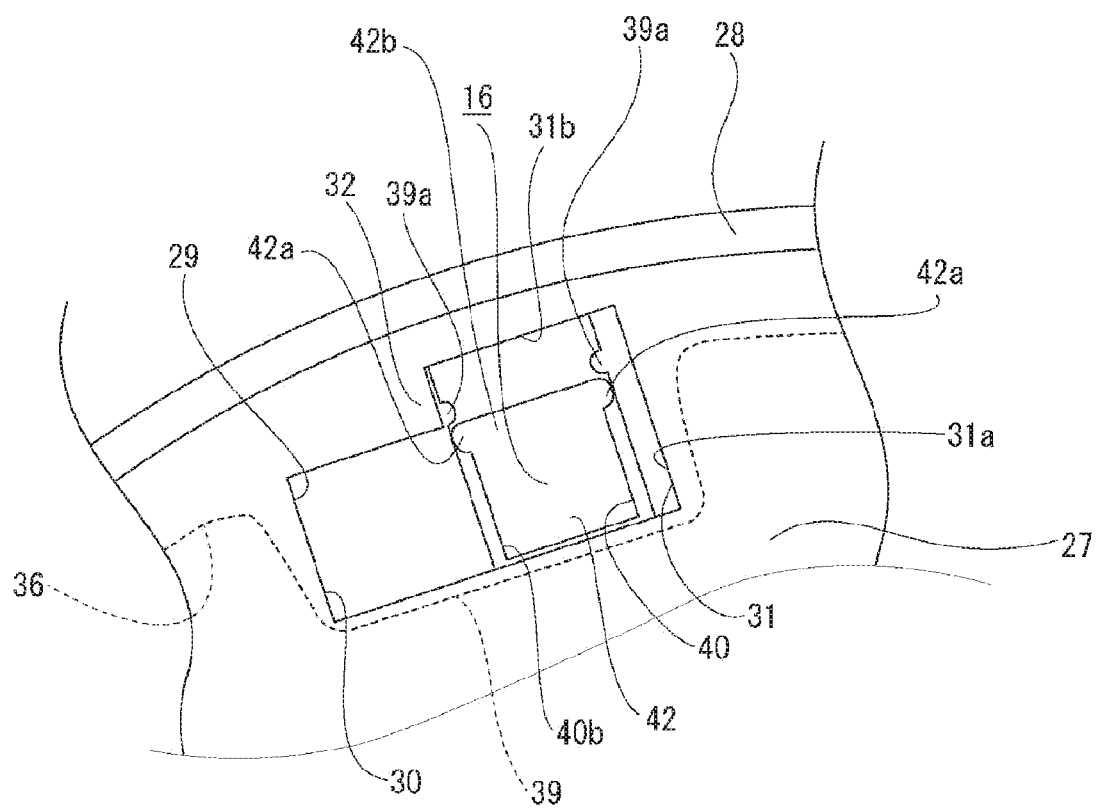
FIG. 13 is a front view illustrating a positional relationship and the like between the actuation lever and the operation lever.

The operation lever 16 is movably supported by the actuation lever 15 (see FIGS. 13 to 15). The operation lever 16 has a plate-like portion to be supported 41 and an operation portion 42 projecting forward from the portion to be supported 41. The operation lever 16 has the portion to be supported 41 inserted from the rear into the arrangement portion 40a of the arrangement hole 40 and arranged in the arrangement portion 40a and has the operation portion 42 inserted into the insertion portion 40b and partly projecting forward from the actuation lever 15.

In the state where the operation lever 16 is supported by the actuation lever 15, the operation lever 16 is unmovable in a longitudinal direction (the R direction in FIG. 14) of the sliding portion 36 with respect to the actuation lever 15 and is movable in a width direction (the H direction in FIGS. 14 and 15) of the sliding portion 16.

The operation portion 42 is provided with projections to be restricted 42a and 42a projecting in opposite directions to each other are provided at one end portions in the direction movable with respect to the actuation lever 15. The projections to be restricted 42a and 42a are formed in a substantially semicylindrical shape.

The operation lever 16 is supported by the actuation lever 15 as described above, and in the state where the actuation lever 15 is supported by the support surface portion 27, the operation portion 42 is inserted from the rear into the action hole 29 of the support base 14 (see FIGS. 11 and 13).

Figure 16:
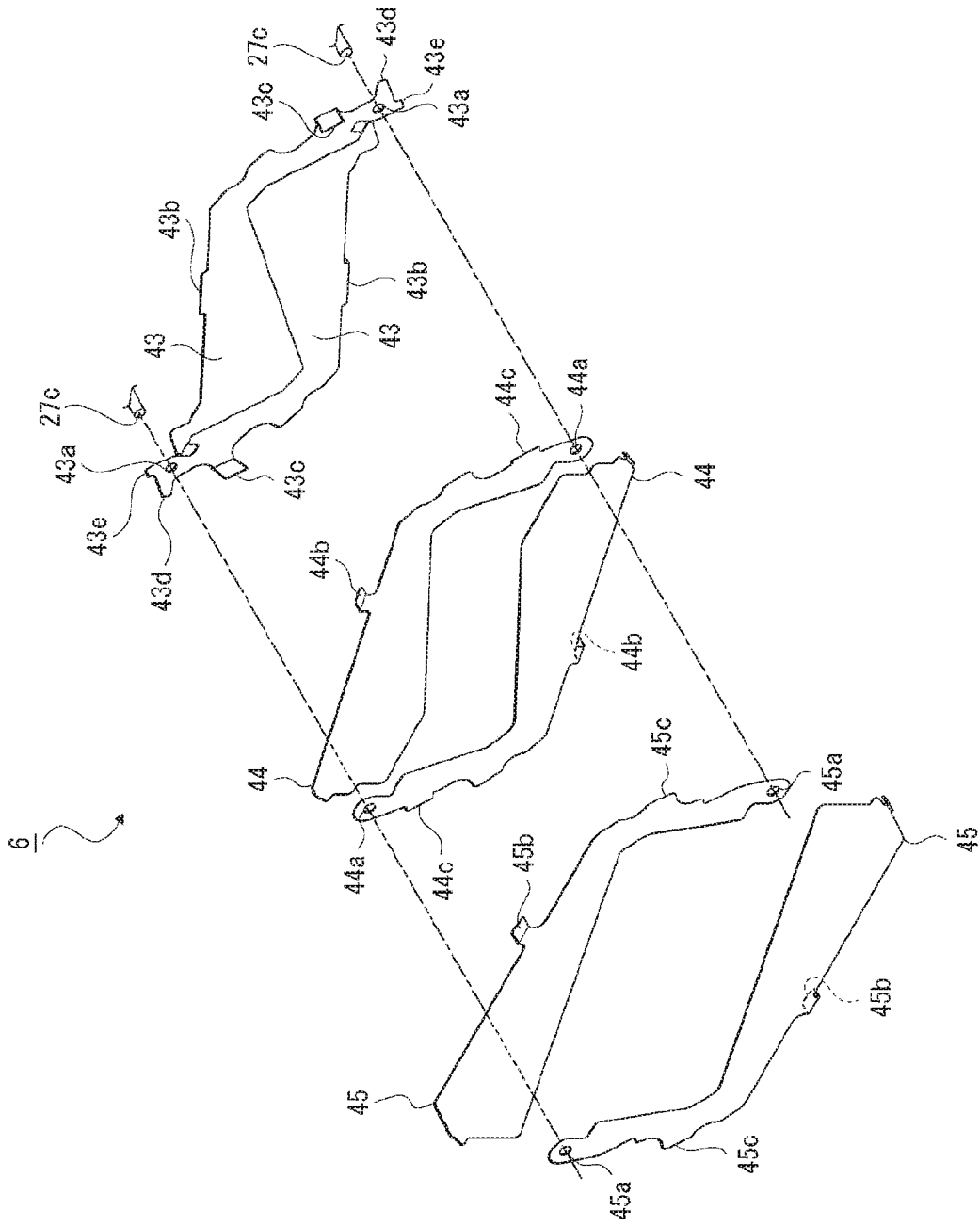
FIG. 16 is an exploded perspective view of a barrier.
Figure 17:
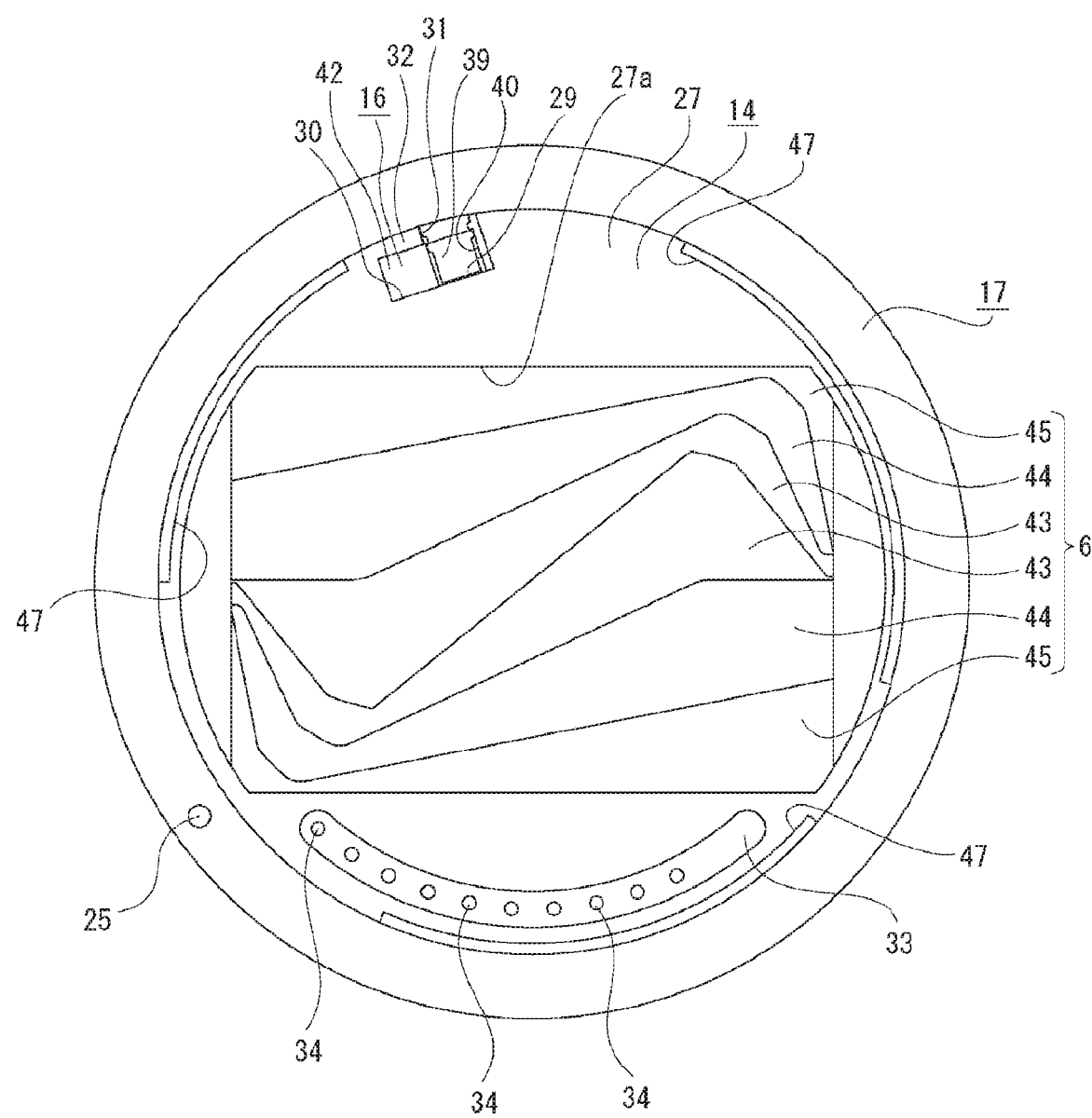
FIG. 17 is a front view illustrating a state in which the operation lever is located inside a mounting portion.
Figure 18:
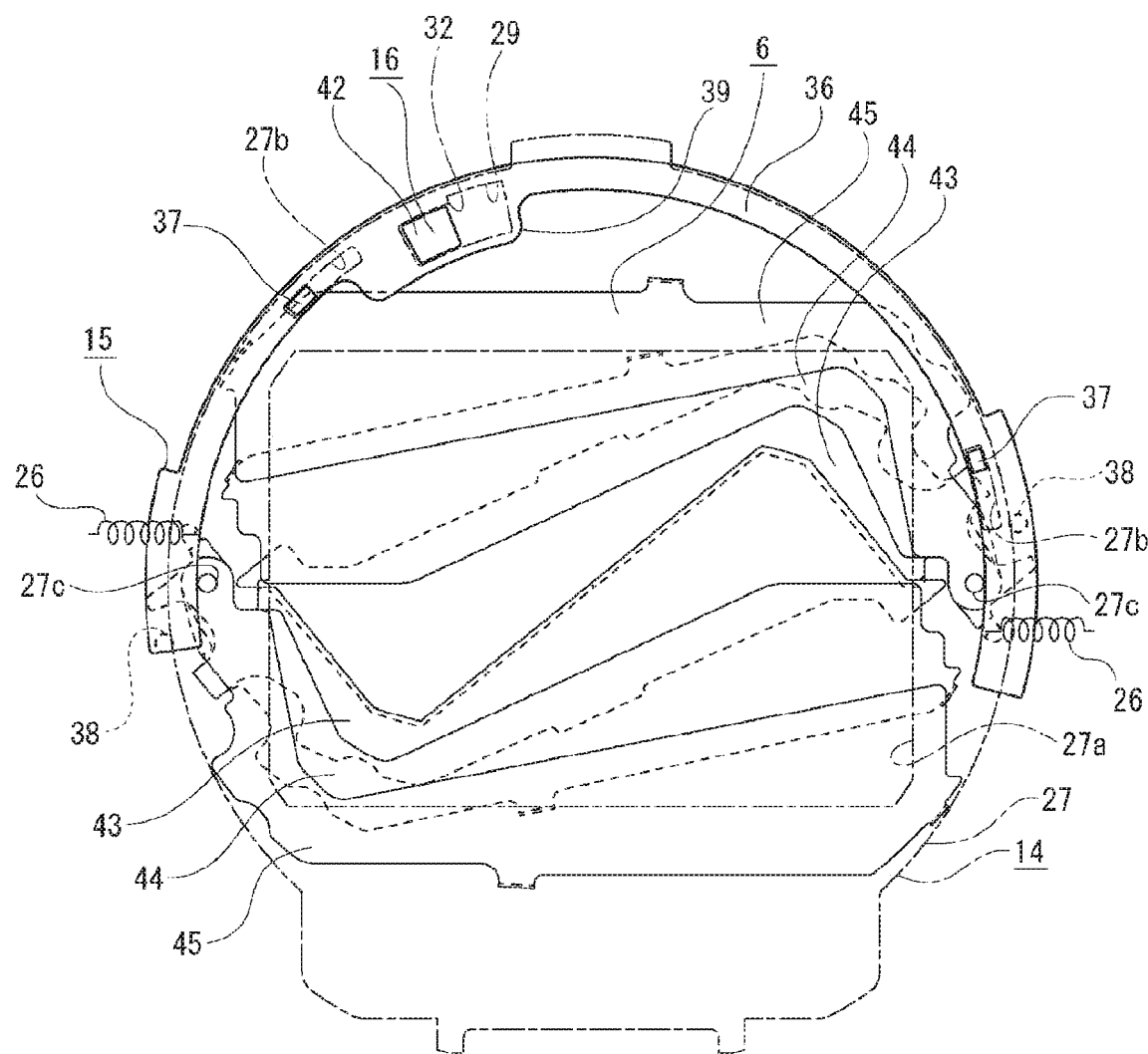
FIG. 18 is a front view illustrating a state in which the barrier and the like are supported by the support base.

The barrier 6 is rotatably supported by the support surface portion 27 of the support base 14 (see FIGS. 16 to 18). The barrier 6 is moved between a closing position for closing the opening 27a formed in the support surface portion 27 of the support base 14 and an opening position for opening the opening 27a.

The barrier 6 is configured by a pair of first blades 43 and 43, a pair of second blades 44 and 44, and a pair of third blades 45 and 45.

All of one first blade 43, one second blade 44, and one third blade 45 are rotatable about one support shaft portion 27c as a fulcrum, the support shaft portion 27c being provided on the support surface portion 27 of the support base 14, and all of the other first blade 43, the other second blade 44, and the other third blade 45 are rotatable about the other support shaft portion 27c as a fulcrum, the support shaft portion 27c being provided on the support surface portion 27 of the support base 14.

A hole to be supported 43a into which the support shaft portion 27c is inserted is formed in a position close to one end of the first blade 43. An opening projection 43b and a closing projection 43c are provided at separated positions in a side edge of the first blade 43, and the closing projection 43c is formed folded forward. A projecting portion to be acted 43d and a projecting spring hook portion 43e are provided in one end portion of the first blade 43. The first blade 43 is rotatable with respect to the support base 14 about the support shaft portion 27c as a fulcrum as the support shaft portion 27c is inserted into the hole to be supported 43a.

The other end portion of the biasing spring 26 is connected to the spring hook portion 43e of the first blade 43, one end portion of the biasing spring 26 being connected to the base member 20. Therefore, the first blade 43 is biased by the biasing spring 26 in a direction of being rotated from the opening position to the closing position.

A hole to be supported 44a into which the support shaft portion 27c is inserted is formed in a position close to one end of the second blade 44. A projecting piece to be pressed 44b and a projection to be pressed 44c are provided on a side edge of the second blade 44, and the projecting piece to be pressed 44b is formed folded rearward. The second blade 44 is rotatable with respect to the support base 14 about the support shaft portion 27c as a fulcrum as the support shaft portion 27c is inserted into the hole to be supported 44a. The second blade 44 is located in a state where at least a part of the second blade 44 is superimposed on the first blade 43 from the front.

A hole to be supported 45a into which the support shaft portion 27c is inserted is formed in a position close to one end of the third blade 45. A projecting piece to be pressed 45b and a projection to be pressed 45c are provided on a side edge of the third blade 45, and the projecting piece to be pressed 45b is formed folded rearward. The third blade 45 is rotatable with respect to the support base 14 about the support shaft portion 27c as a fulcrum as the support shaft portion 27c is inserted into the hole to be supported 45a. The third blade 45 is located in a state where at least a part of the third blade 45 is superimposed on the second blade 44 from the front.

The mounting portion 17 is configured such that a ring member 46 and an engaging member 47 are coupled in the front-rear direction (see FIGS. 7 and 8).

The ring member 46 is formed in an annular shape, and has a pin insertion hole 46a penetrating in the front-rear direction is formed in the ring member 46.

The engaging member 47 has an annular base portion 48 and engaging portions 49, 49, and 49 projecting inward from the base portion 48. The engaging portions 49, 49, and 49 are located apart in the circumferential direction of the base portion 48, and respectively have engaging grooves 49a, 49a, and 49a opening inward and rearward. The engaging member 47 is coupled to an inner peripheral portion of a rear surface of the ring member 46.

The mounting portion 17 has the ring member 46 attached to the annular portion 23 of the base body 13 from the front. In a state where the mounting portion 17 is attached to the base body 13, the insertion pin 25 connected to the release button 24 is inserted from the rear into the pin insertion hole 46a of the ring member 46, and a front end portion of the insertion pin 25 projects forward through the ring member 46.

In the state where the mounting portion 17 is attached to the base body 13, the operation lever 16 is located inside the mounting portion 17 (see FIG. 17). The operation lever 16 is located near an inner periphery of the ring member 46, for example.

Note that the operation lever 16 may be located at position other than near the inner periphery of the ring member 46 as long as the position is inside the mounting portion 17, and may exist at an arbitrary position between the opening 27a and the ring member 46, for example. Furthermore, the operation lever 16 may be located at an outer peripheral portion of the mounting portion 17 or at an inner peripheral portion of the mounting portion 17, other than the front portion of the mounting portion 17.

<Configuration of Interchangeable Lens>

Figure 19:
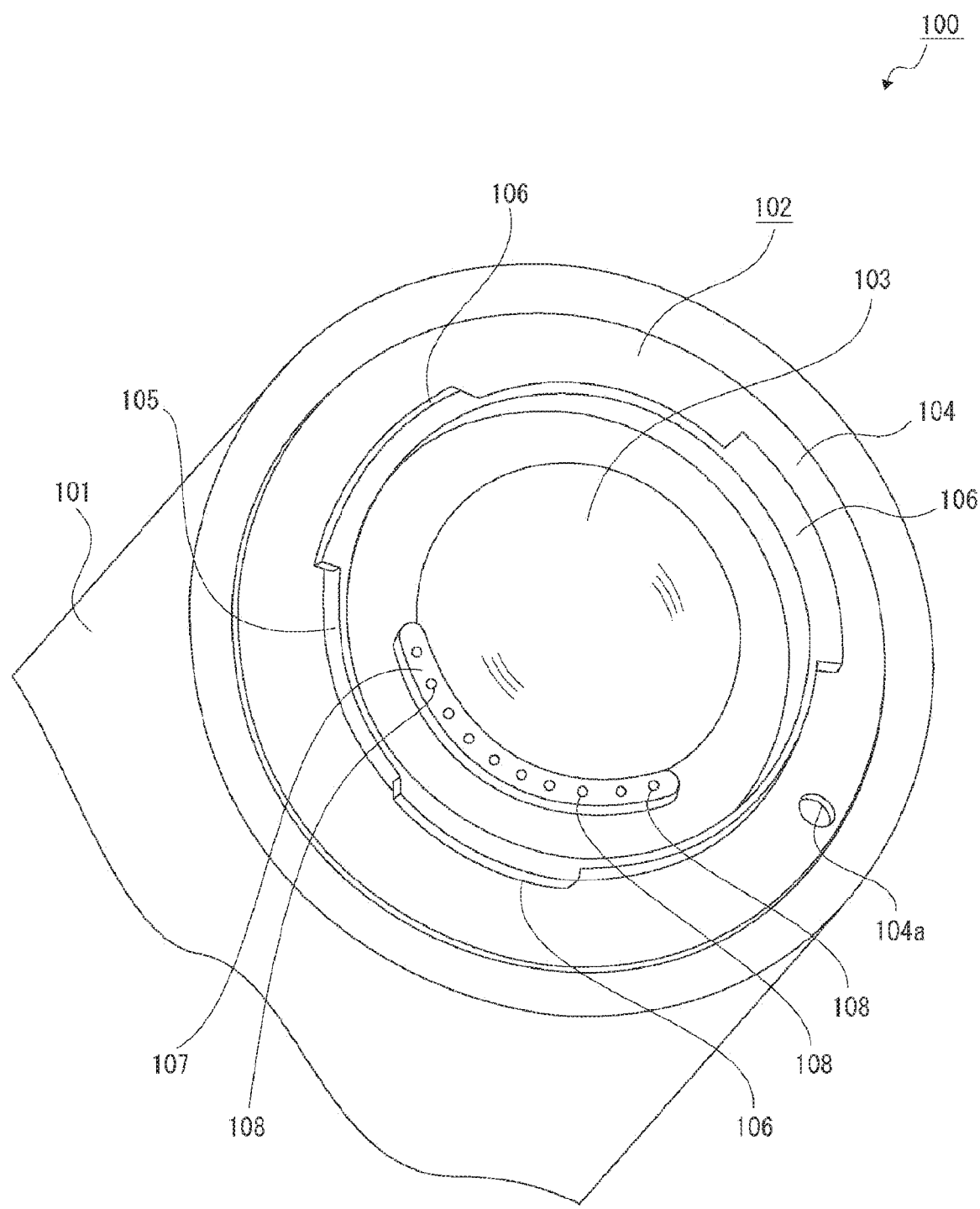
FIG. 19 is a perspective view illustrating a rear end portion of the interchangeable lens.

The interchangeable lens 100 functioning as an accessory is attachable to and detachable from the mounting portion 17 of the imaging device 1 (see FIG. 19).

The interchangeable lens 100 has an outer tube 101 and a coupling ring 102 attached to a rear surface of the outer tube 101, and required parts are arranged inside and outside the outer tube 101.

An adjustment ring (not illustrated) is rotatably supported on the outer peripheral surface of the outer tube 101 while being spaced apart in the front-rear direction. The adjustment ring has a function to perform, for example, focusing adjustment, zooming adjustment, light amount adjustment of the diaphragm, and the like.

A plurality of lens groups is arranged apart in an optical axis direction inside the outer tube 101. A rear lens 103 located on a rearmost side is arranged as a part of the lens group inside the outer tube 101.

The coupling ring 102 includes a substantially annular base ring portion 104, a cylindrical connecting portion 105 projecting rearward from an inner peripheral portion of the base ring portion 104, and arc coupling portions 106, 106, and 106 projecting outward from a rear end portion of the connecting portion 105. The coupling ring 102 has the base ring portion 104 attached to the rear surface of the outer tube 101. A lock hole 104a is formed in the base ring portion 104.

A terminal arrangement portion 107 is provided inside the coupling ring 102 at a rear end portion of the outer tube 101. The terminal arrangement portion 107 is formed in a circular arc shape and has a plurality of terminals 108, 108, and the like located apart in the longitudinal direction (circumferential direction).

<Attaching and Detaching Actions or the Like of Interchangeable Lens with Respect to Mounting Portion>

Hereinafter, attaching and detaching actions of the interchangeable lens 100 with respect to the mounting portion 17 and actions of the barrier 6 with the attaching and detaching actions will be described (see FIGS. 20 to 29).

First, an initial state of each portion before the interchangeable lens 100 is attached to the mounting portion 17 will be described (see FIG. 20).

Figure 20:
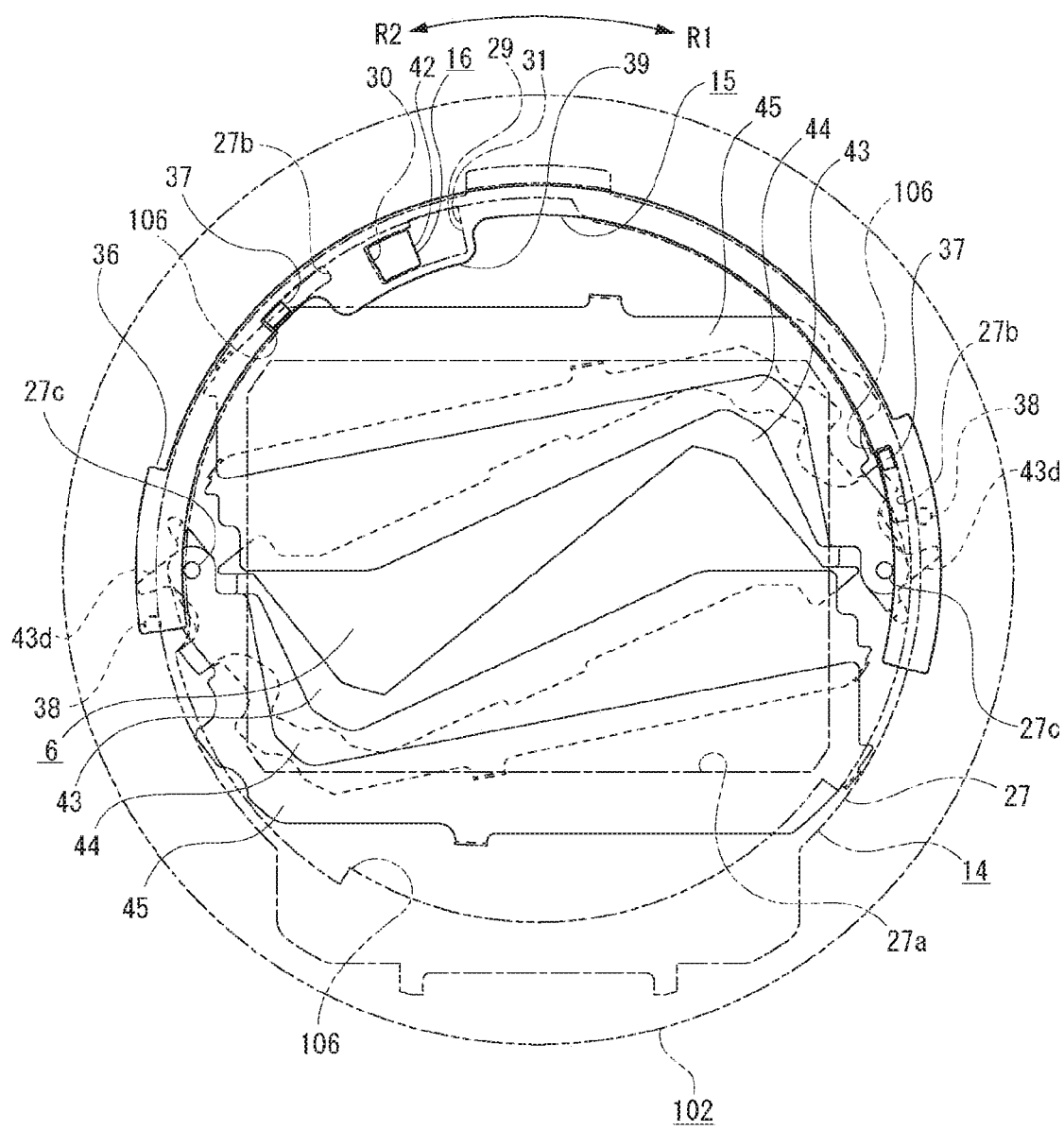
FIG. 20 illustrates actions of the barrier and the like together with FIGS. 21 to 29, and is a front view illustrating an initial state.

In the initial state, the actuation lever 15 is located at one moving end (a moving end in an R2 direction illustrated in FIG. 20). At this time, the operation lever 16 is located in the first portion 30 of the action hole 29 formed in the support base 14.

In the initial state, the barrier 6 is biased in a direction in which the first blades 43 and 43 approach each other by biasing force of the biasing springs 26 and 26, and is at the closing position where the barrier 6 closes the opening 27a of the support base 14. At this time, the portions to be acted 43d and 43d of the first blades 43 and 43 are respectively located near the pressing projections 38 and 38 on the actuation lever 15.

Figure 21:
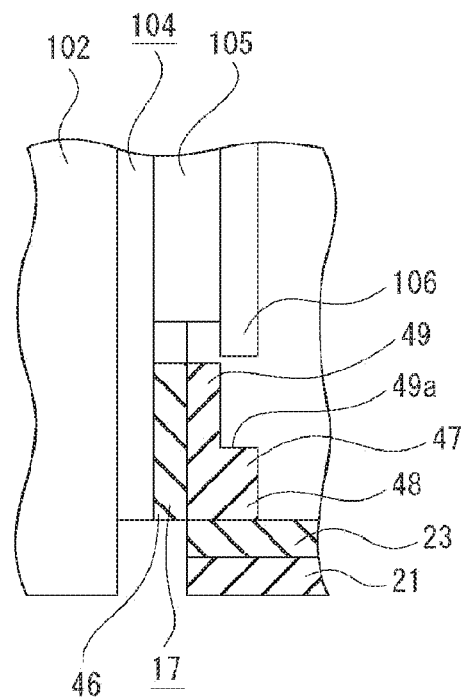
FIG. 21 is a cross-sectional view illustrating a state in which a base ring portion of the interchangeable lens is pressed against a ring member of the mounting portion.
Figure 22:
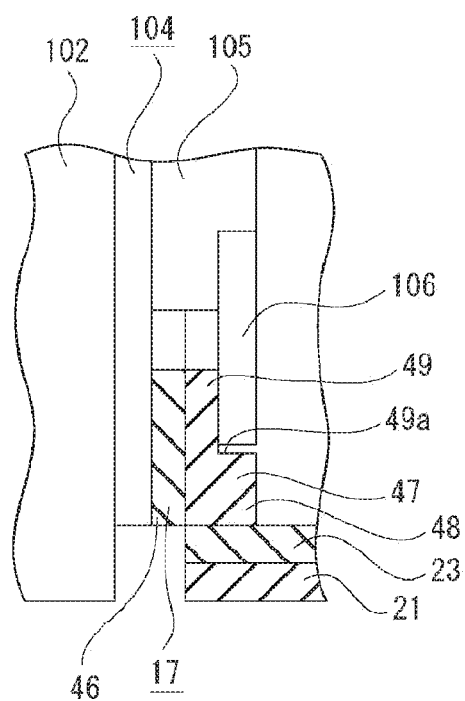
FIG. 22 is a cross-sectional view illustrating a state in which the interchangeable lens is attached to the mounting portion.

In the above-described initial state, the interchangeable lens 100 has the coupling portions 106, 106, and 106 of the coupling ring 102 respectively inserted from the front into the engaging portions 49, 49, and 49 of the engaging member 47 (see FIG. 21). At this time, the coupling ring 102 has the base ring portion 104 pressed against the ring member 46 of the mounting portion 17, and the insertion pin 25 is pushed into the pin insertion hole 46a by the base ring portion 104. Note that marks are desirably attached to the interchangeable lens 100 and the imaging device 1 in order to position the base ring portion 104 to the ring member 46 in the circumferential direction in attaching the interchangeable lens 100 to the mounting portion 17.

The terminal arrangement portion 107 of the interchangeable lens 100 is located facing the contact placement portion 33 of the imaging device 1 as the base ring portion 104 is pressed against the ring member 46.

Next, the interchangeable lens 100 is rotated in an R1 direction with respect to the mounting portion 17. When the interchangeable lens 100 is rotated in the R1 direction, the coupling portions 106, 106, and 106 of the coupling ring 102 are respectively inserted into the engaging grooves 49a, 49a, and 49a of the engaging portions 49, 49, and 49, and the coupling portions 106, 106, and 106 are respectively engaged with the engaging portions 49, 49, and 49 and the interchangeable lens 100 is attached to the mounting portion 17 (see FIG. 22). At this time, the interchangeable lens 100 is rotated in the R1 direction to a predetermined position, and when the lock hole 104a of the base ring portion 104 is located facing the pin insertion hole 46a of the ring member 46, the insertion pin 25 is moved forward together with the release button 24 by the biasing force of the spring member, and the insertion pin 25 is inserted into the lock hole 104a.

Therefore, further rotation of the interchangeable lens 100 in the R1 direction is restricted, and the interchangeable lens 100 is attached to the mounting portion 17 in the locked state.

When the interchangeable lens 100 is attached to the mounting portion 17 in the locked state, the terminals 108, 108, and the like of the interchangeable lens 100 are respectively connected to the contacts 34, 34, and the like of the imaging device 1. When the terminals 108, 108, and the like are respectively connected to the contacts 34, 34, and the like, data communication becomes possible between the interchangeable lens 100 and the imaging device 1.

When the interchangeable lens 100 is rotated in the R1 direction as described above, the actuation lever 15 and the barrier 6 are moved as follows.

Figure 23:
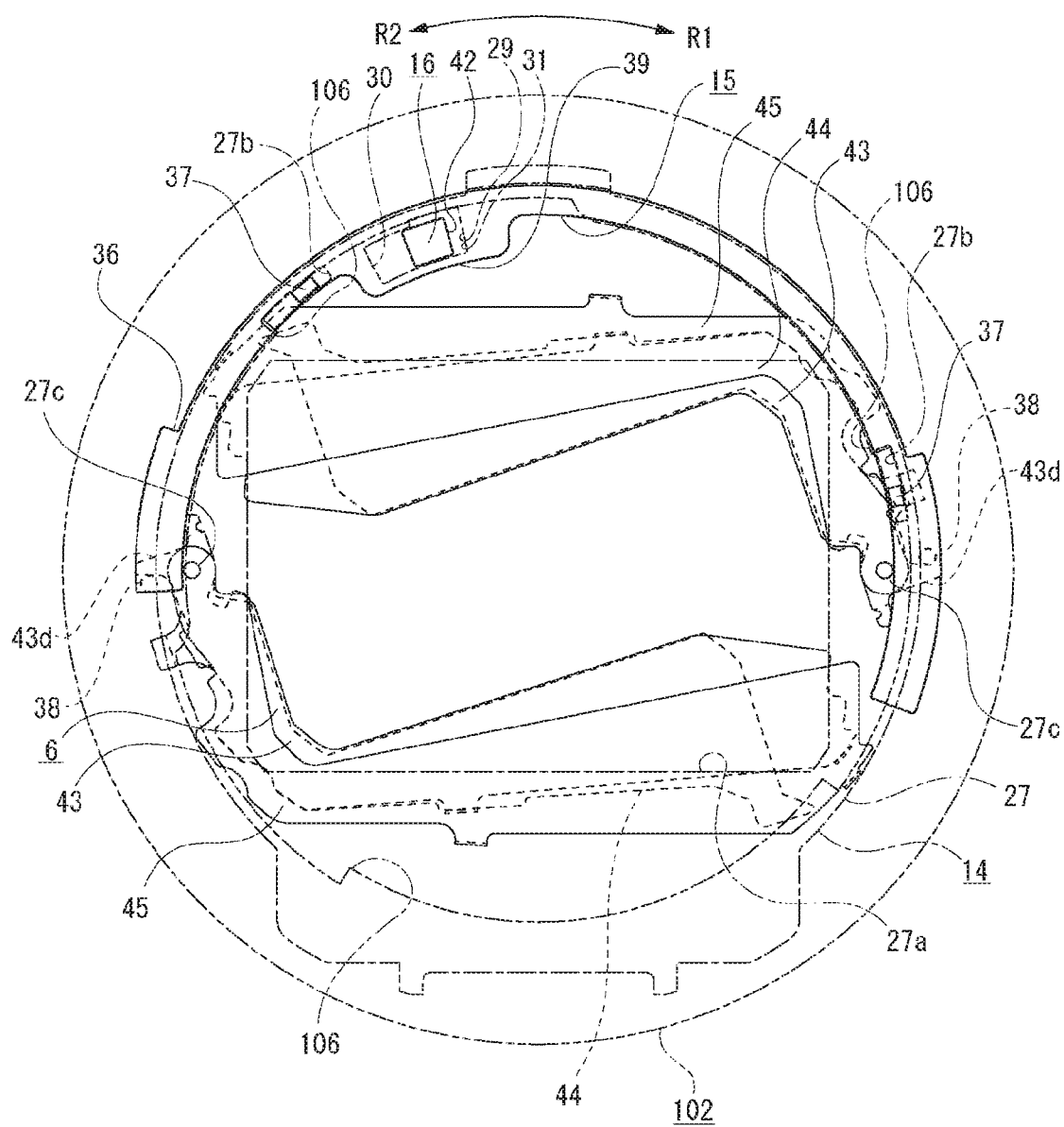
FIG. 23 is a front view illustrating a state in which the actuation lever is moved and the opening is kept opened.

When the interchangeable lens 100 is rotated in the R1 direction in the state where the base ring portion 104 of the interchangeable lens 100 is pressed against the ring member 46 of the mounting portion 17, the portions of action 37 and 37 of the actuation lever 15 are simultaneously pressed by the two coupling portions 106 and 106, respectively, and the actuation lever 15 and the operation lever 16 are moved together in the R1 direction with respect to the support base 14 (see FIG. 23).

When the portions of action 37 and 37 are pressed by the coupling portions 106 and 106 and the actuation lever 15 is moved in the R1 direction, the portions to be acted 43d and 43d of the first blades 43 and 43 are respectively pressed by the pressing projections 38 and 38. Therefore, the first blades 43 and 43 are rotated about the support shaft portions 27c and 27c as fulcrums in directions away from each other against the biasing forces of the biasing springs 26 and 26.

When the first blades 43 and 43 are rotated in the directions away from each other, the projecting pieces to be pressed 44b and 44b of the second blades 44 and 44 are respectively pressed by the opening projections 43b and 43b, and the second blades 44 and 44 are rotated in directions away from each other.

When the first blades 43 and 43 are further rotated in the directions away from each other, then the projecting pieces to be pressed 45b and 45b of the third blades 45 and 45 are respectively pressed by the opening projections 43b and 43b, and the third blades 45 and 45 are rotated in directions away from each other.

Figure 24:
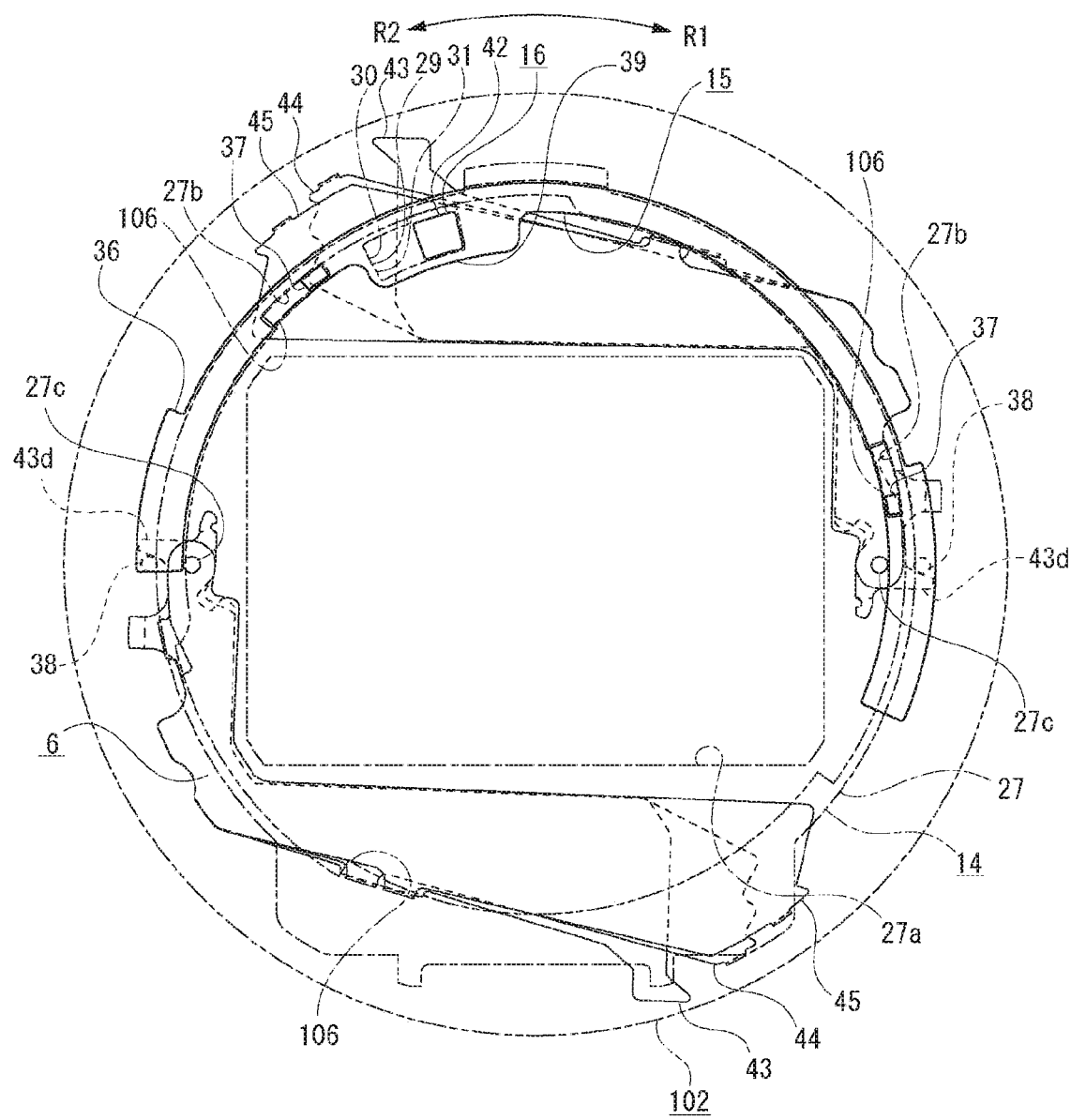
FIG. 24 is a front view illustrating a state in which the actuation lever is moved and the opening is opened.
Figure 25:
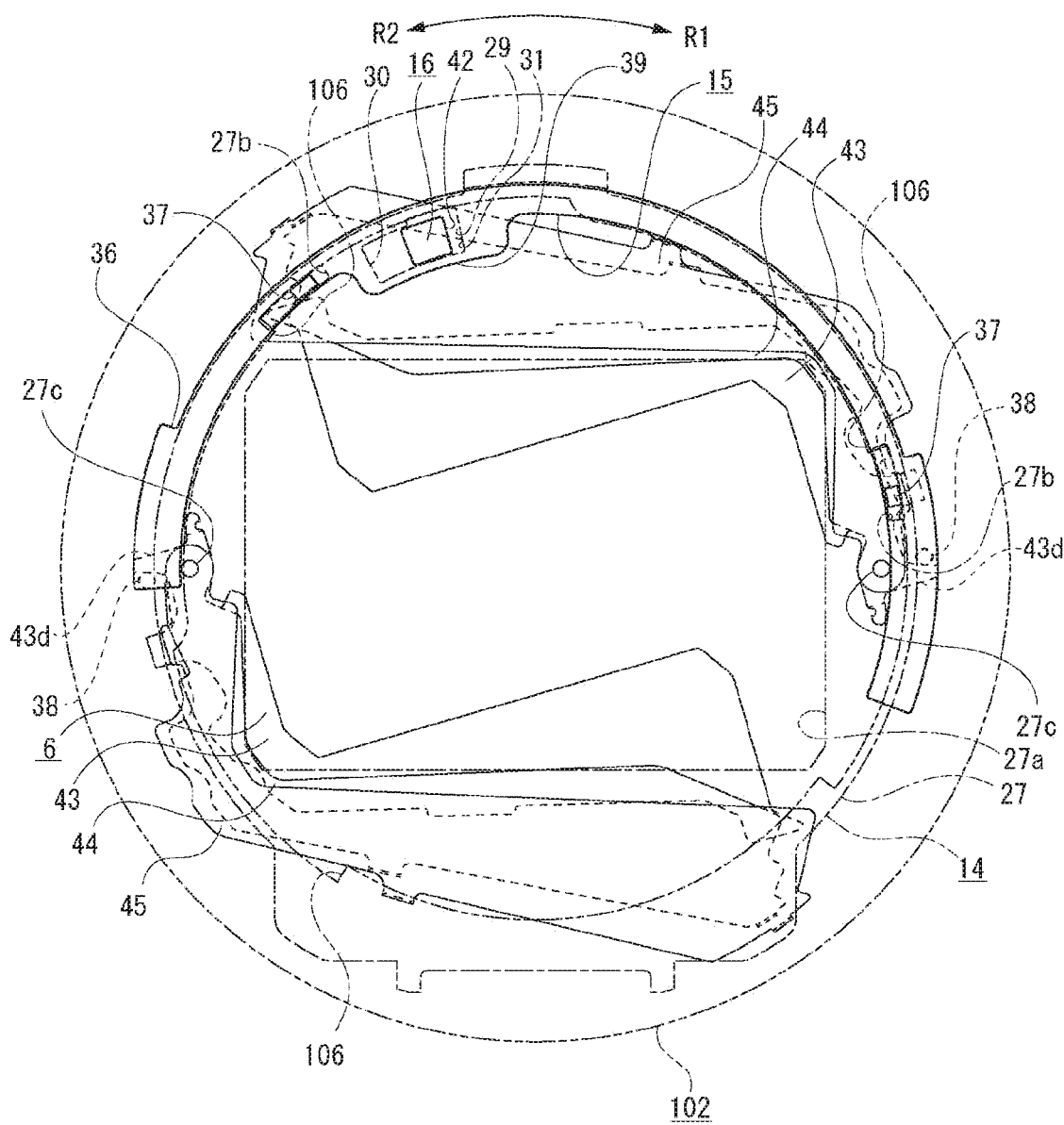
FIG. 25 is a front view illustrating a state in which the actuation lever is moved and the opening is kept closed.

When the first blades 43 and 43, the second blades 44 and 44, and the third blades 45 and 45 are rotated in the directions away from each other, and the interchangeable lens 100 is rotated in the R1 direction and attached to the mounting portion 17 in the locked state, the rotated first blades 43 and 43, the rotated second blades 44 and 44, and the rotated third blades 45 and 45 reach positions to open the entire opening 27a of the support base 14, and the barrier 6 reaches the opening position (see FIG. 24).

Therefore, the capture light taken in by the interchangeable lens 100 at the time of capture enters the imaging element 8 via the opening 27a of the support base 14 and the light transmission hole 22a of the base body 13, and the incident capture light is converted into the electrical signal by photoelectric conversion by the imaging element 8.

Meanwhile, detachment of the interchangeable lens 100 from the mounting portion 17 can be performed by pressing the release button 24 and pulling out the insertion pin 25 from the lock hole 104a to unlock the locked state, rotating the interchangeable lens 100 in the R2 direction opposite to the R1 direction to disengage the coupling portions 106, 106, and 106 from the engaging portions 49, 49, and 49, and pulling out the coupling portions 106, 106, and 106 from the mounting portion 17.

When the interchangeable lens 100 is rotated in the R2 direction in this way, the actuation lever 15 and the barrier 6 are moved as follows.

When the interchangeable lens 100 is rotated in the R2 direction as described above, the pressing of the portions of action 37 and 37 in the R1 direction by the two coupling portions 106 and 106 are canceled. Therefore, when the actuation lever 15 is moved in the R2 direction, the first blades 43 and 43 are rotated about the support shaft portions 27c and 27c as fulcrums in directions approaching each other by the biasing forces of the biasing springs 26 and 26 (see FIG. 25). At this time, the actuation lever 15 has the pressing projections 38 and 38 respectively pressed by the portions to be acted 43d and 43d of the first blades 43 and 43 and is moved together with the operation lever 16 in the R2 direction with respect to the support base 14.

When the first blades 43 and 43 are rotated in the directions approaching each other, the projections to be pressed 44c and 44c of the second blades 44 and 44 are respectively pressed by the closing projections 43c and 43c, and the second blades 44 and 44 are rotated in directions approaching each other.

Furthermore, when the first blades 43 and 43 are rotated in the directions approaching each other, the projections to be pressed 45c and 45c of the third blades 45 and 45 are also respectively pressed by the closing projections 43c and 43c, and the third blades 45 and 45 are rotated in directions approaching each other.

When the first blades 43 and 43, the second blades 44 and 44, and the third blades 45 and 45 are rotated in the directions approaching each other, and the engagement of the coupling portions 106, 106, and 106 with the engaging portions 49, 49, and 49 in the interchangeable lens 100 is disengaged, the rotated first blades 43 and 43, the rotated second blades 44 and 44, and the rotated third blades 45 and 45 reach positions to close the entire opening 27a of the support base 14, and the barrier 6 reaches the closing position again (see FIG. 20).

At this time, the actuation lever 15 and the operation lever 16 return to the original positions before the interchangeable lens 100 is attached to the mounting portion 17.

As described above, in the imaging device 1, the barrier 6 is moved with the attaching and detaching actions of the interchangeable lens 100 with respect to the mounting portion 17, the barrier 6 reaches the opening position to open the opening 27a in the state where the interchangeable lens 100 is attached to the mounting portion 17, and the barrier 6 reaches the closing position to close the opening 27a in the state where the interchangeable lens 100 is detached from the mounting portion 17.

Note that the operation lever 16 is unmovable in the circumferential direction of the sliding portion 36 with respect to the actuation lever 15 as described above. Therefore, when the actuation lever 15 is moved in the circumferential direction, the operation lever 16 is moved together with the actuation lever 15. At this time, the coupling portions 106, 106, and 106 of the interchangeable lens 100 are moved at positions not in contact with the operation portion 42 of the operation lever 16.

Therefore, since the operation portion 42 exists at the position not in contact with the interchangeable lens 100 at the time of attachment and detachment of the interchangeable lens 100 with respect to the mounting portion 17, the operation portion 42 is not operated by the interchangeable lens 100 at the time of attachment and detachment of the interchangeable lens 100 with respect to the mounting portion 17, and unintentional unlock of the operation portion 42 at the time of attachment and detachment of the interchangeable lens 100 with respect to the mounting portion 17 can be prevented.

Furthermore, in the imaging device 1, the actuation lever 15 that moves the barrier 6 by being moved with the attaching action of the interchangeable lens 100 to the mounting portion 17 is provided.

Therefore, the actuation lever 15 is move to move the barrier 6 between the opening position and the closing position to open and close the opening 27a when the interchangeable lens 100 is attached to and detached from the mounting portion 17, and thus it is not necessary to separately perform the attaching and detaching work of the interchangeable lens 100 and the opening and closing work of the opening 27a, and the workability in the imaging device 1 can be improved.

As described above, in the imaging device 1, the barrier 6 is moved when the interchangeable lens 100 is attached to the mounting portion 17, and the barrier 6 reaches the opening position in the state where the interchangeable lens 100 is attached to the mounting portion 17. However, it is also possible to move the barrier 6 to lock at the opening position by the operation for the operation lever 16.

Hereinafter, the action when the operation lever 16 is operated will be described (see FIGS. 26 to 29).

Since the operation lever 16 is located inside the mounting portion 17, the operation lever 16 is manually operated in a state where the interchangeable lens 100 is not attached to the mounting portion 17, for example.

Figure 26:
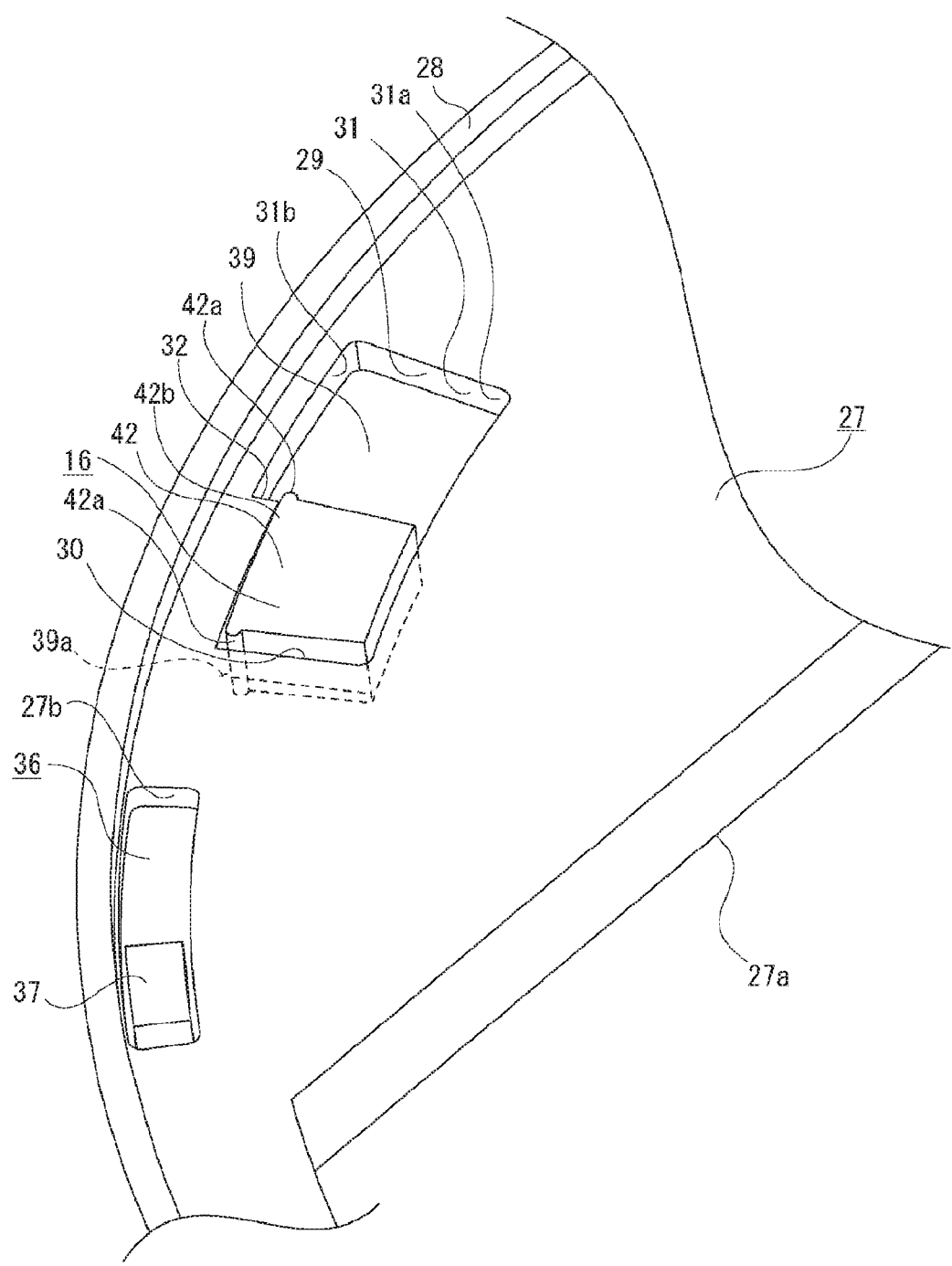
FIG. 26 is a perspective view illustrating a state before the operation lever is operated.
Figure 27:
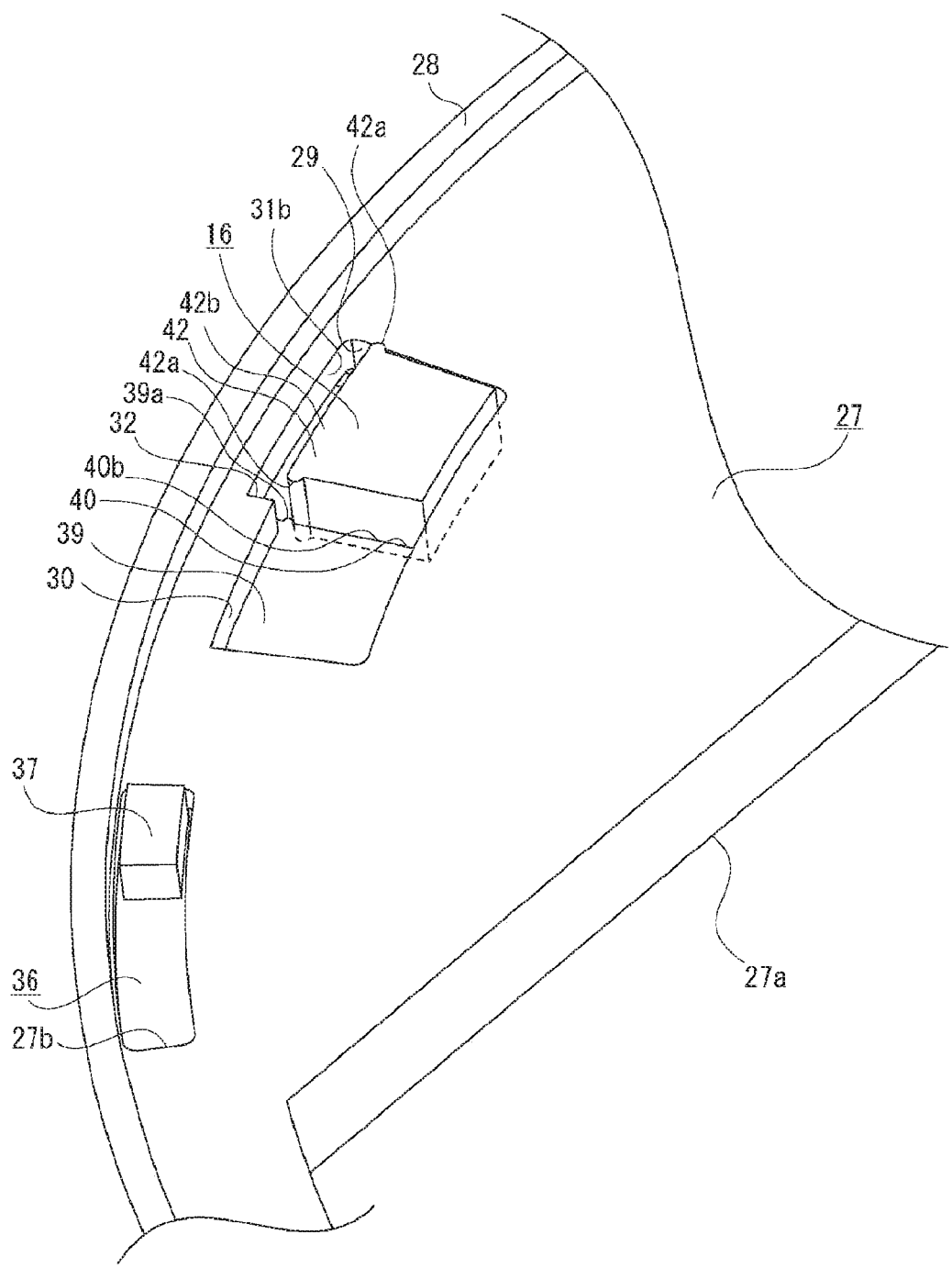
FIG. 27 is a perspective view illustrating a state in which the operation lever is operated and moved to a second portion of an action hole.

The operation lever 16 is located in the first portion 30 of the action hole 29 in the support base 14 in a state before operated (see FIG. 26).

When the operation lever 16 is operated in the R1 direction, the actuation lever 15 and the operation lever 16 are moved together in the R1 direction with respect to the support base 14. At this time, the operation lever 16 is moved from the first portion 30 to the non-lock space 31a of the second portion 31 (see FIG. 27).

When the operation lever 16 is operated in the R1 direction, the first blades 43 and 43, the second blades 44 and 44, and the third blades 45 and 45 are moved similarly to the action when the portions of action 37 and 37 are pressed by the coupling portions 106 and 106 of the interchangeable lens 100 and the actuation lever 15 is moved in the R1 direction, and the barrier 6 reaches the opening position when the operation lever 16 is moved to the non-lock space 31a of the second portion 31.

Figure 28:
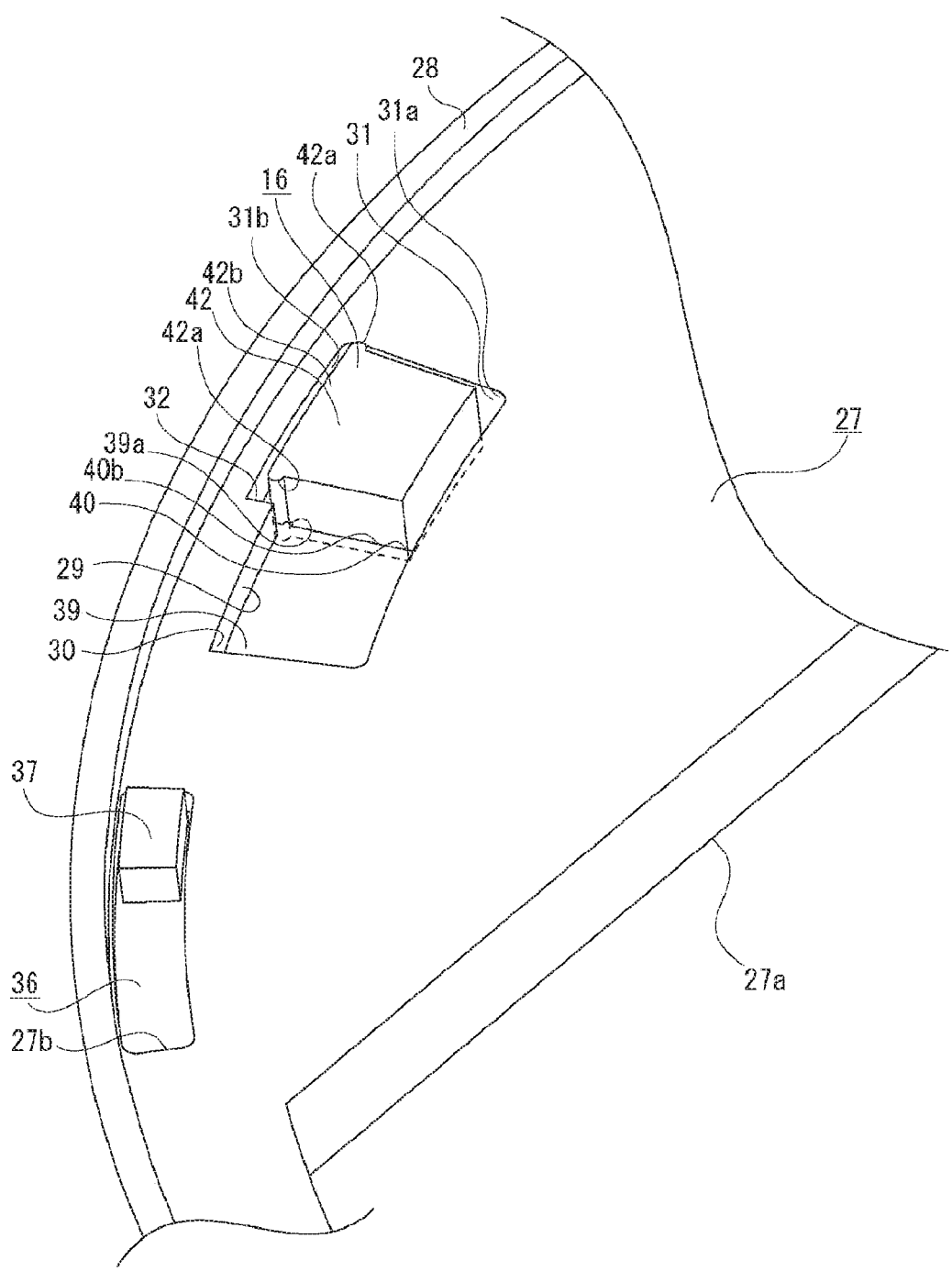
FIG. 28 is a perspective view illustrating a state in which the operation lever is operated and locked.

Subsequently, the operation lever 16 is operated to the flange portion 28 side of the support base 14 with respect to the actuation lever 15, and an end portion 42b on the projections to be restricted 42a and 42a in the operation portion 42 is moved from the non-lock space 31a to the lock space 31b (see FIG. 28). At this time, the projections to be restricted 42a and 42a respectively ride over the restriction projections 39a and 39a provided on the lever support portion 39 of the actuation lever 15, and the end portion 42b is moved to the lock space 31b.

When the projections to be restricted 42a and 42a ride over the restriction projections 39a and 39a, one or both of the projections to be restricted 42a and 42a and the restriction projections 39a and 39a are elastically deformed and then elastically restored.

With the movement of the end portion 42b of the operation lever 16 to the lock space 31b, the movement of the operation lever 16 from the lock space 31b to the non-lock space 31a is restricted by the restriction projections 39a and 39a, and the end portion 42b is held in the lock space 31b.

In the state where the operation lever 16 has the end portion 42b held in the lock space 31b, the movement of the operation portion 42 in the R2 direction in the circumferential direction is restricted by the restriction portion 32 provided in the support surface portion 27 of the support base 14, and the movement of the operation lever 16 is restricted, so the movement of the actuation lever 15 in the R2 direction in the circumferential direction is also restricted.

Figure 29:
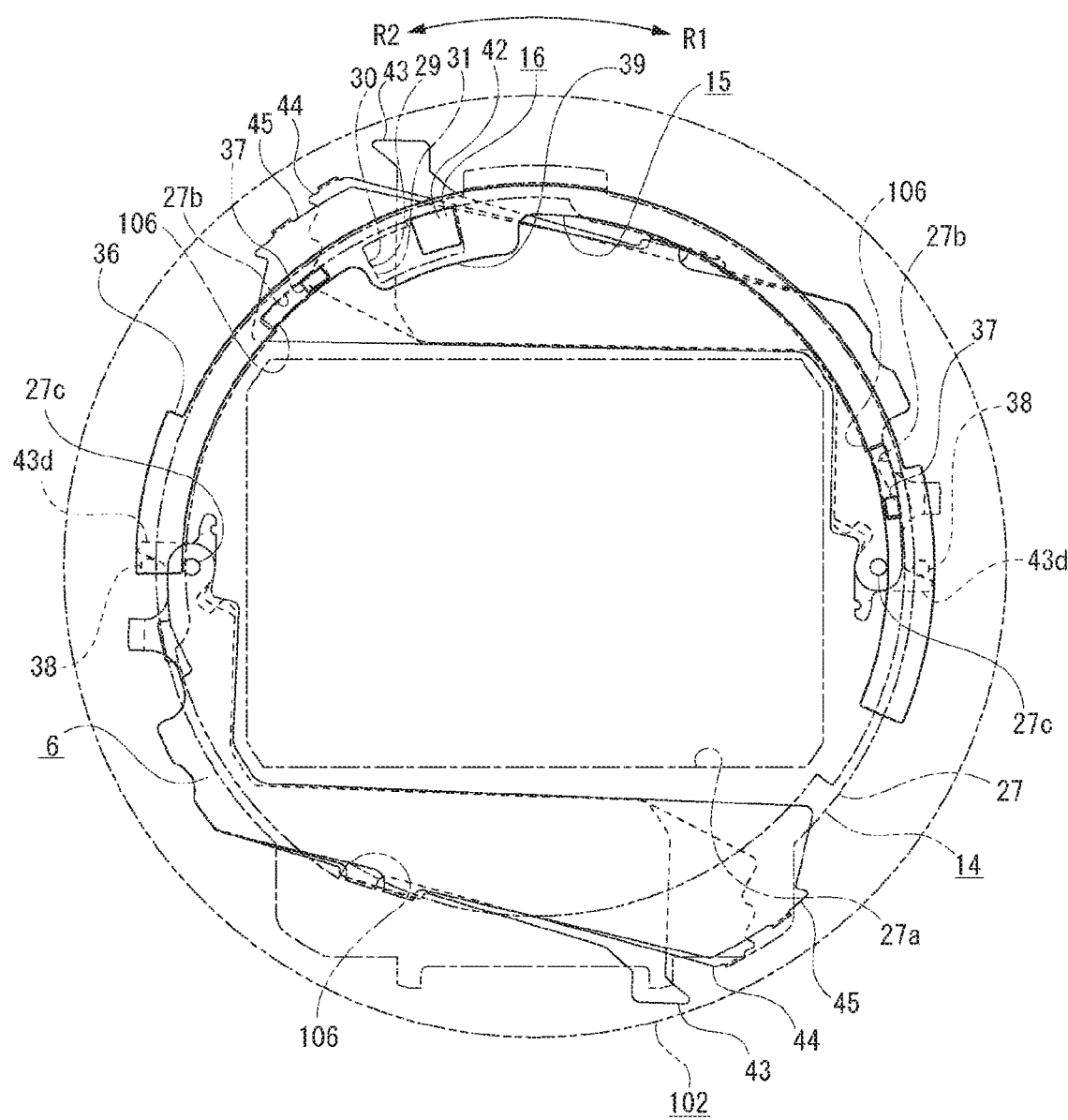
FIG. 29 is a front view illustrating a state in which the operation lever is locked in a state where the opening is opened.

With the restriction of the movement of the actuation lever 15 in the R2 direction, the barrier 6 is held at the opening position for opening the opening 27a of the support base 14 even in a state where the user releases the finger, which has operated the operation lever 16, from the operation lever 16 (see FIG. 29).

Therefore, in the state where the user releases the finger from the operation lever 16, cleaning of removing dust, moisture, and the like adhering to the imaging element 8 with cloth or the like through the opening 27a can be performed.

Furthermore, there is a case where the actuation lever 15 is not moved in the circumferential direction and the barrier 6 is not moved to the opening position when the interchangeable lens is attached to the mounting portion 17 due to a difference in shape or the like of the coupling portion depending on a type of the interchangeable lens. Therefore, even in such a case, the operation lever 16 is set to the locked state before the interchangeable lens is attached to the mounting portion 17, and in the state where the barrier 6 is held at the opening position, the interchangeable lens is attached to the mounting portion 17 and capture and the like using the interchangeable lens can be performed.

Meanwhile, when the operation lever 16 is operated from the lock space 31b to the non-lock space 31a and the operation lever 16 is unlocked in the state where the operation portion 42 is locked by the restriction portion 32, the first blades 43 and 43, the second blades 44 and 44, and the third blades 45 and 45 are rotated in the directions approaching each other by the biasing forces of the biasing springs 26 and 26 by similar action to that when the interchangeable lens 100 is rotated in the R2 direction, and the barrier 6 reaches the closing position again (see FIG. 20).

As described above, in the imaging device 1, the barrier 6 is moved by the operation for the operation lever 16, and the barrier 6 reaches the opening position to open the opening 27a or the barrier 6 reaches the closing position to close the opening 27a.

<Summary in Embodiment>

As described above, the imaging device 1 includes the portion to be acted 37 for moving the barrier 6 with the attaching action of the interchangeable lens 100 to the mounting portion 17, and the operation portion 42 that moves the barrier 6 regardless of the attaching action of the interchangeable lens 100 to the mounting portion 17, and the operation portion 42 is located inside the mounting portion 17 or at the front portion of the mounting portion 17.

Therefore, since the barrier 6 is moved between the closing position and the opening position by the operation for the operation portion 42 located inside the mounting portion 17 or at the front portion of the mounting portion 17 to open and close the opening 27a, the finger is less likely to touch the operation portion 42 in the state where the user holds the imaging device 1, and the usability of the imaging device 1 can be improved.

Furthermore, since the operation portion 42 is located inside the mounting portion 17 or at the mounting portion 17, the finger is less likely to accidentally touch the operation portion 42 in the state where the user holds the imaging device 1 at the time of capture or the like. Therefore, occurrence of erroneous operation at the time of use of the imaging device 1 can be prevented.

Moreover, the restriction portion 32 that restricts the operation of the operation portion 42 to disable the movement of the barrier 6 is provided.

Therefore, since the barrier 6 is held at a predetermined position by the restriction of the operation of the operation portion 42 by the restriction portion 32, the barrier 6 is not unintentionally moved between the opening position and the closing position, and desired processing and work for the imaging device 1 can be easily performed.

Still furthermore, the barrier 6 is held at the opening position by the restriction of the operation of the operation portion 42 by the restriction portion 32.

Therefore, since the barrier 6 is held at the opening position by the restriction of the operation of the operation portion 42 by the restriction portion 32, the barrier 6 is not unintentionally moved from the opening position to the closing position, and the desired processing and work for the imaging device 1 at the opening position, for example, cleaning of the imaging element 8 and the like can be easily performed.

Moreover, since the actuation lever 15 moved with the attaching action of the interchangeable lens 100 is provided, the actuation lever 15 is moved with the attaching action of the interchangeable lens 100 and the portion to be acted 37 is moved, and the portion to be acted 37 can be reliably moved with the simple structure.

Furthermore, the restriction portion 32 is provided in the support base 14.

Therefore, since the restriction portion 32 is provided in the support base 14 that movably supports the actuation lever 15, special parts for providing the restriction portion 32 are not necessary, and simplification and downsizing of the structure of the imaging device 1 by reduction of the number of parts can be achieved.

Moreover, the operation lever 16 is supported by the actuation lever 15.

Therefore, since the actuation lever 15 and the operation lever 16 do not exist at separated positions, the total arrangement space of the actuation lever 15 and the operation lever 16 becomes small and downsizing of the imaging device 1 can be achieved.

Still furthermore, the actuation lever 15 has the two portions of action 37 and 37 simultaneously pressed and moved by the coupling portions 106 and 106 of the interchangeable lens 100 at the attaching and detaching actions of the interchangeable lens 100 with respect to the mounting portion 17.

Therefore, pressing force given from the interchangeable lens 100 to the actuation lever 15 is dispersed in two places, and improvement of the durability of the actuation lever 15 can be achieved, and the balance at the time of movement of the actuation lever 15 is increased and stable movement action can be secured.

Note that the number of portions of the actuation lever 15 to which the pressing force is given from the interchangeable lens 100 is not limited to two, and may be one, or three or more.

The imaging device 1 includes the operation portion 42 that moves the barrier 6 regardless of the attaching action of the interchangeable lens 100 to the mounting portion 17 and the restriction portion 32 that restricts the operation of the operation portion 42 to disable the movement of the barrier 6, and the operation portion 42 is located inside the mounting portion 17 or at the front portion of the mounting portion 17.

Therefore, since the barrier 6 is moved between the closing position and the opening position by the operation for the operation portion 42 located inside the mounting portion 17 or at the front portion of the mounting portion 17 to open and close the opening 27a, the finger is less likely to touch the operation portion 42 in the state where the user holds the imaging device 1, and the usability of the imaging device 1 can be improved.

Furthermore, in the imaging device 1, since the operation portion 42 is located inside the mounting portion 17 or at the mounting portion 17, the finger is less likely to accidentally touch the operation portion 42 in the state where the user holds the imaging device 1 at the time of capture or the like, and occurrence of erroneous operation at the time of use of the imaging device 1 can be prevented.

Moreover, since the barrier 6 is held at a predetermined position as the operation portion 42 is locked by the restriction portion 32, the barrier 6 is not unintentionally moved between the opening position and the closing position, and the desired processing and work for the imaging device 1 at the opening position, for example, cleaning of the imaging element 8 and the like can be easily performed.

The imaging device 1 includes the operation portion 42 that moves the barrier 6 regardless of the attaching action of the interchangeable lens 100 to the mounting portion 17, and the operation portion 42 is located inside the mounting portion 17 or at the front portion of the mounting portion 17 at a position not in contact with the interchangeable lens 100 at the time of attachment and detachment of the interchangeable lens 100 with respect to the mounting portion 17.

Therefore, since the barrier 6 is moved between the closing position and the opening position by the operation for the operation portion 42 located inside the mounting portion 17 or at the front portion of the mounting portion 17 to open and close the opening 27a, the finger is less likely to touch the operation portion 42 in the state where the user holds the imaging device 1, and the usability of the imaging device 1 can be improved.

Furthermore, since the operation portion 42 is located inside the mounting portion 17 or at the mounting portion 17, the finger is less likely to accidentally touch the operation portion 42 in the state where the user holds the imaging device 1 at the time of capture or the like, and occurrence of erroneous operation at the time of use of the imaging device 1 can be prevented.

Moreover, the operation portion 42 is not operated by the interchangeable lens 100 at the time of attachment and detachment of the interchangeable lens 100 with respect to the mounting portion 17, and unintentional unlock of the operation portion 42 can be prevented at the time of attachment and detachment of the interchangeable lens 100 with respect to the mounting portion 17.

<Another Configuration Example>

Hereinafter, another configuration example regarding the actuation lever 15, the operation lever 16, and the like will be described (see FIGS. 30 to 41).

First, a first configuration example will be described (see FIGS. 30 to 32).

In the first configuration example, an unlock lever 50 movable in the circumferential direction on the outer peripheral portion of the support surface portion 27 in the support base 14. In the unlock lever 50, an inclined surface of action 50a that is displaced to an outer peripheral side of the support surface portion 27 toward one direction (R1 direction) is formed in one end portion in the longitudinal direction, and a surface to be pressed 50b is formed on the other end surface in the longitudinal direction.

The unlock lever 50 is moved when the operation lever 16 is locked by the restriction portion 32 and acts on the operation lever 16. The unlock lever 50 is biased in the R2 direction by a spring (not illustrated).

Figure 30:
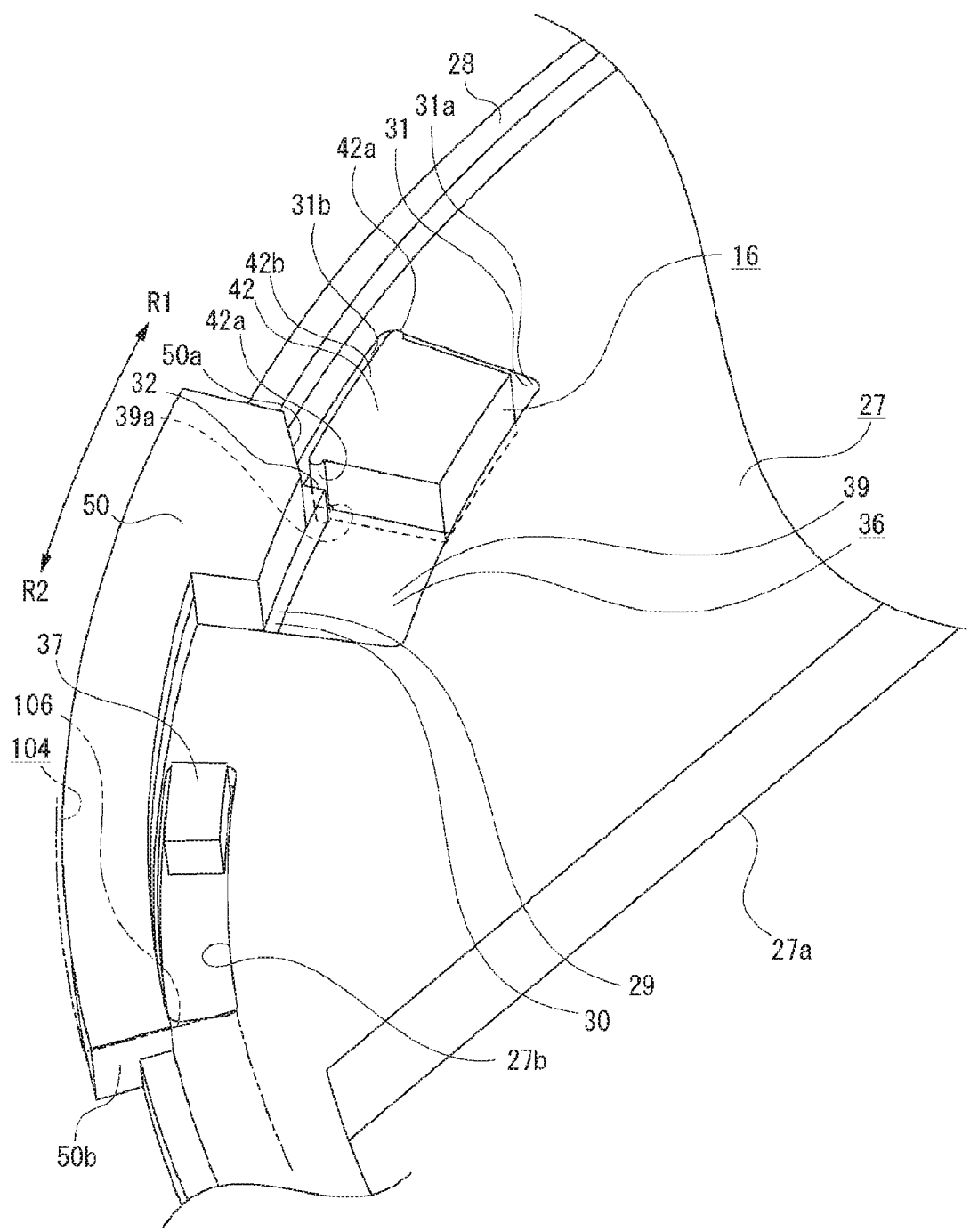
FIG. 30 illustrates configuration examples together with FIGS. 31 to 41, and is a perspective view illustrating a state before an unlock lever is moved in a first configuration example.

In a state where the interchangeable lens 100 is not attached to the mounting portion 17 when the operation lever 16 is locked, the unlock lever 50 has the inclined surface of action 50a located near the end portion 42b in the operation lever 16 (see FIG. 30).

Figure 31:
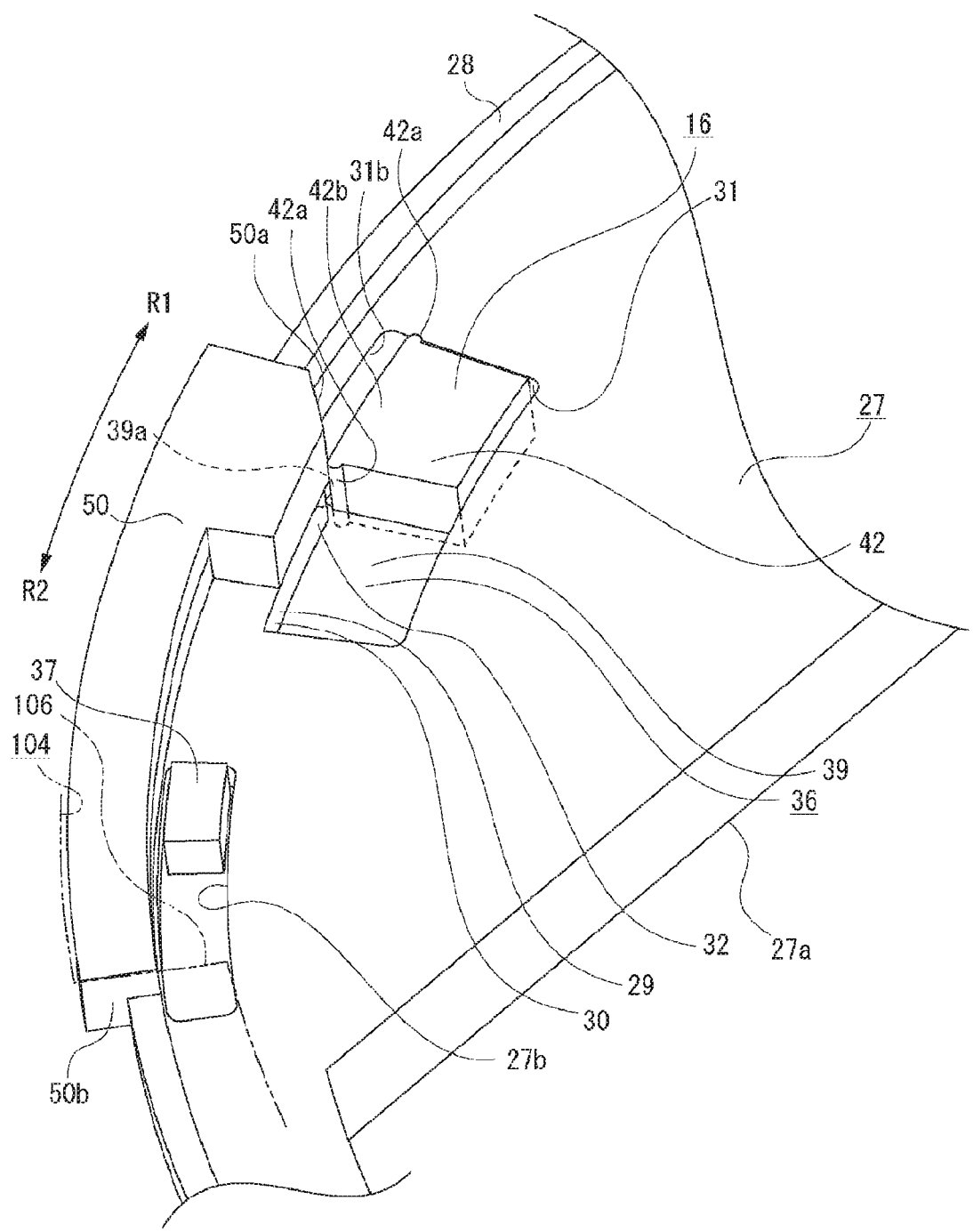
FIG. 31 is a perspective view illustrating a state in which the operation lever is unlocked by the unlock lever in the first configuration example.
Figure 32:
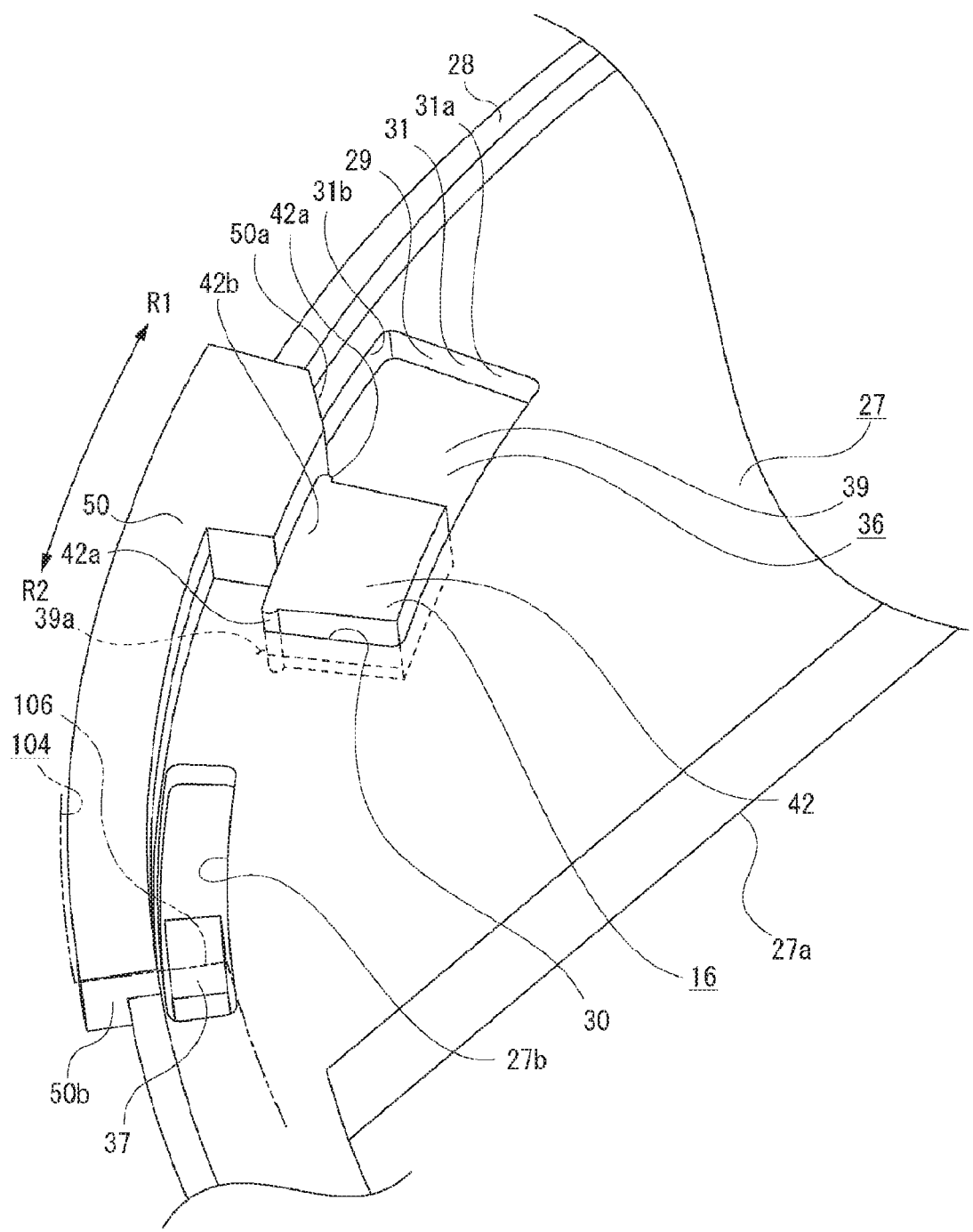
FIG. 32 is a perspective view illustrating a state in which the portion to be acted of the actuation lever is pressed together with the unlock lever by a coupling portion of the interchangeable lens in the first configuration example.

When the interchangeable lens 100 is rotated with respect to the mounting portion 17 at the time of attachment of the interchangeable lens 100 to the mounting portion 17, the surface to be pressed 50b of the unlock lever 50 is pressed in the R1 direction by the coupling portion 106, and the unlock lever 50 is moved in the R1 direction against the biasing force of the spring (see FIG. 31). When the unlock lever 50 is moved in the R1 direction, the inclined surface of action 50a is slid by the end portion 42b of the operation lever 16, and the operation lever 16 is moved to the non-lock space 31a side and the operation lever 16 is unlocked.

When the operation lever 16 is unlocked, the actuation lever 15 and the operation lever 16, to which the biasing force of the biasing spring 26 has been transmitted via the first blade 43, are moved together in the R2 direction. At this time, since the interchangeable lens 100 has been rotated in the R1 direction with respect to the mounting portion 17, the portion to be acted 37 of the actuation lever 15 is pressed together with the surface to be pressed 50b of the unlock lever 50 by the coupling portion 106, and the actuation lever 15 is moved in the R1 direction (see FIG. 32). Therefore, the barrier 6 reaches the opening position by the movement of the actuation lever 15 in the R1 direction when the interchangeable lens 100 is attached to the mounting portion 17.

When the interchangeable lens 100 is detached from the mounting portion 17, the actuation lever 15 and the operation lever 16, to which the biasing force of the biasing spring 26 has been transmitted via the first blade 43, are moved together in the R2 direction, the barrier 6 reaches the opening position, and the unlock lever 50 is moved in the R2 direction and returns to the original position by the biasing force of the spring.

As described above, in the first configuration example, when the interchangeable lens 100 is attached to the mounting portion 17 in the locked state of the operation lever 16, the operation lever 16 is unlocked and the barrier 6 is moved to the opening position by the interchangeable lens 100.

Therefore, since the unlock action of the operation lever 16 and the action of the barrier 6 to the opening position are continuously performed by the attaching action of the interchangeable lens 100, it is not necessary to separately perform the unlock operation of the operation lever 16 and the operation of the barrier 6 to the opening position, the attachment of the interchangeable lens 100 can be easily and promptly performed, and loss of capture opportunities can be decreased.

Next, a second configuration example will be described (see FIGS. 33 to 35).

In the second configuration example, an operation lever 16A is provided in place of the operation lever 16, and the operation lever 16A is integrally provided with the actuation lever 15. The operation lever 16A may be fixed to the sliding portion 36 of the actuation lever 15, and is not moved with respect to the actuation lever 15 and is integrally moved with the actuation lever 15.

The operation lever 16A has an operation portion 42A. The operation portion 42A is provided with projections to be restricted 42c and 42c projecting in opposite directions to each other are provided at one end portions in the moving direction of the actuation lever 15. The projections to be restricted 42c and 42c are formed in a substantially semi-cylindrical shape.

An action hole 29A is formed in place of the action hole 29 in a support surface portion 27A of the support base 14, and the action hole 29A is formed in a gentle arc shape extending in the circumferential direction. The support surface portion 27A is provided with substantially semicylindrical restriction portions 51 and 51 at an opening edge of the action hole 29A, the restriction portions 51 and 51 projecting in directions approaching each other. The restriction portions 51 and 51 are provided at positions close to one end portion in the circumferential direction of the action hole 29A. In the action hole 29A, a space on R2 side with respect to the restriction portions 51 and 51 is formed as a non-lock space 29a, and a space on R1 side is formed as a lock space 29b.

Figure 33:
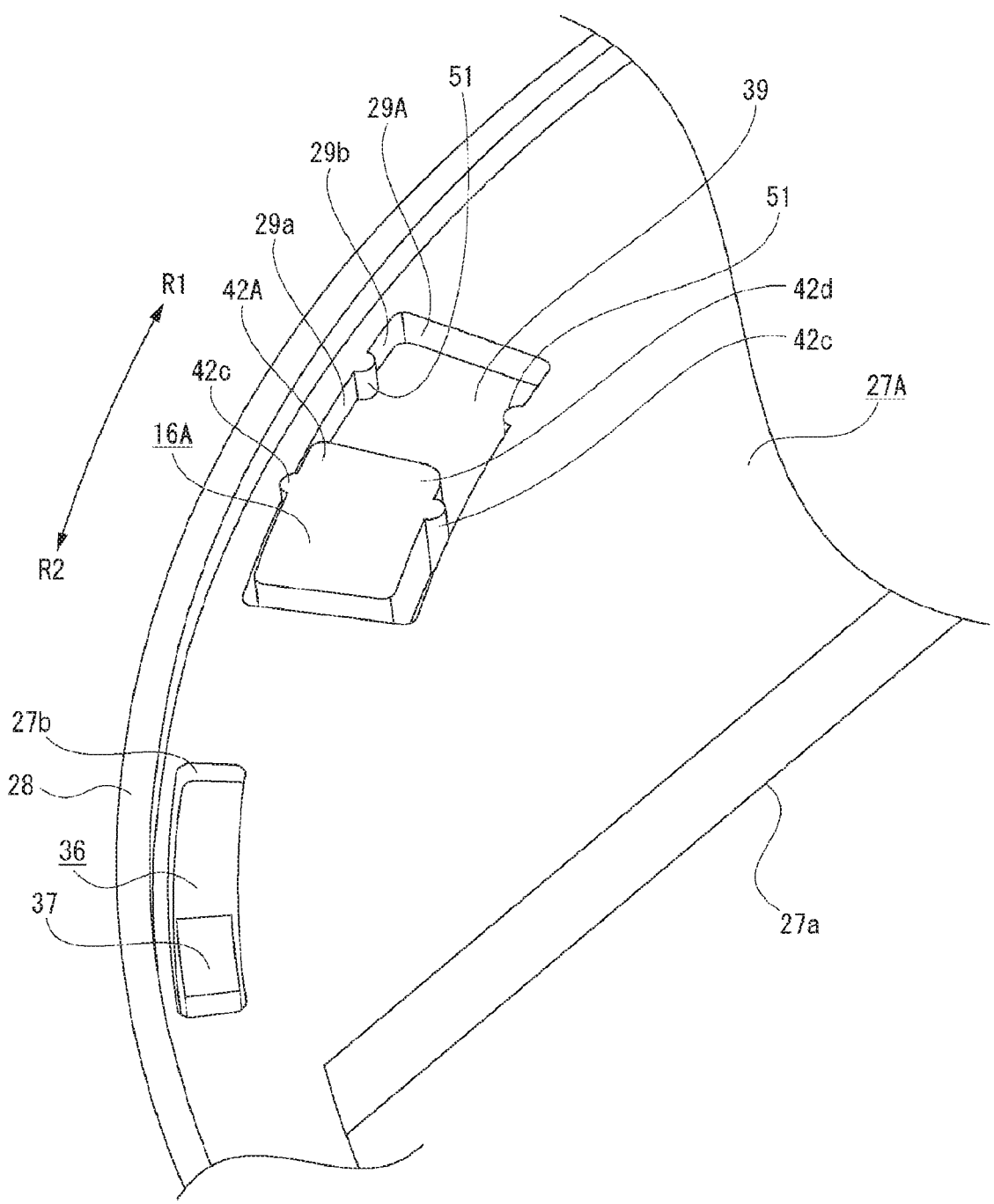
FIG. 33 is a perspective view illustrating a state before the operation lever is operated in a second configuration example.

The operation lever 16A is located in an end portion on the R2 side of the non-lock space 29a in the action hole 29A in a state before operated (see FIG. 33).

Figure 34:
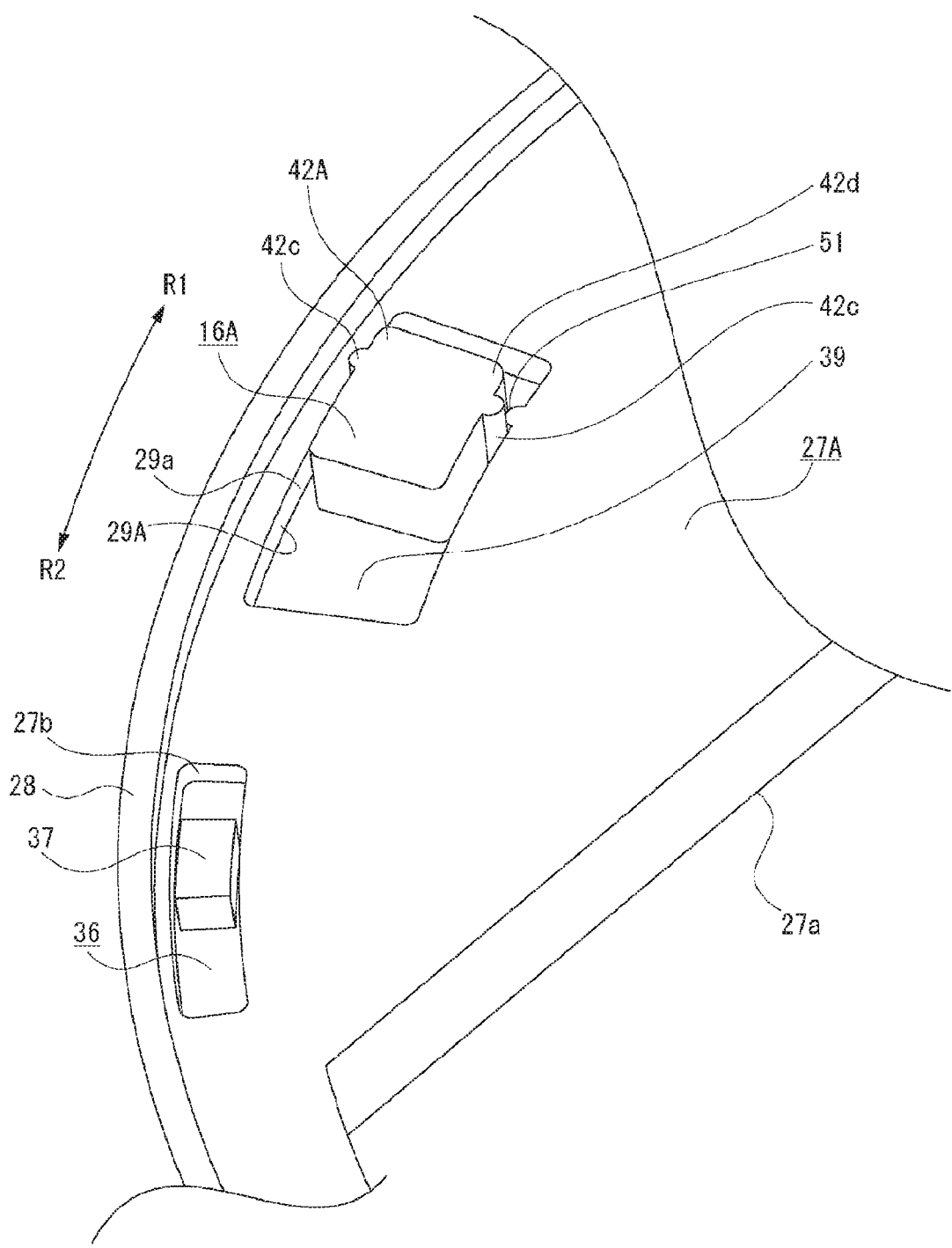
FIG. 34 is a perspective view illustrating a state in which the operation lever is operated in the second configuration example.
Figure 35:
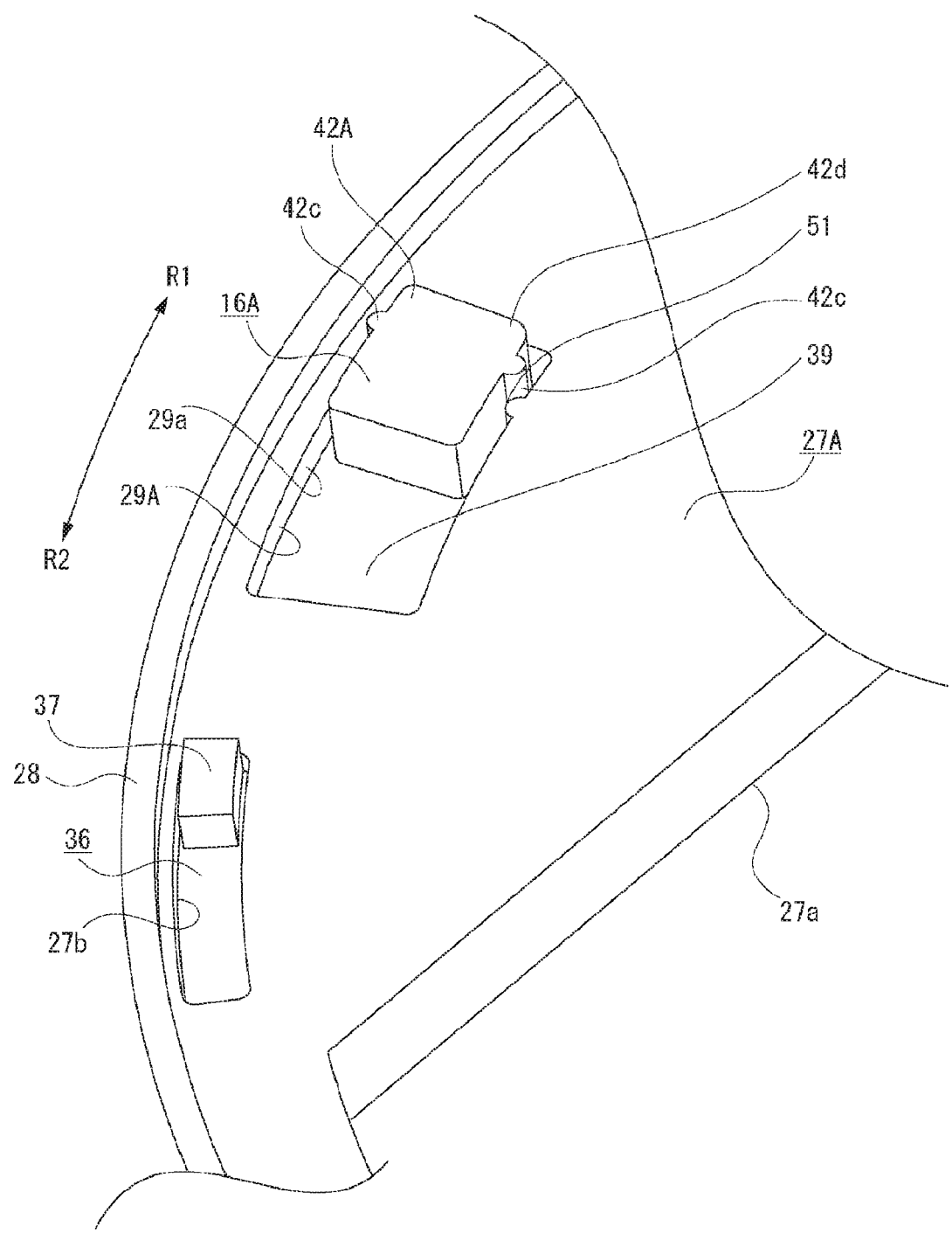
FIG. 35 is a perspective view illustrating a state in which the operation lever is locked in the second configuration example.

When the operation lever 16A is operated in the R1 direction, the actuation lever 15 and the operation lever 16A are moved together in the R1 direction with respect to the support base 14 (see FIG. 34). At this time, the operation lever 16A is moved to an end portion on the R1 direction side of the non-lock space 29a, and the projections to be restricted 42c and 42c are respectively brought into contact with or close to the restriction portions 51 and 51, and the opening 27a is opened by the barrier 6.

Subsequently, when the operation lever 16A is operated in the R1 direction, the projections to be restricted 42c and 42c respectively ride over the restriction portions 51 and 51 and an end portion 42d is moved to the lock space 29b (see FIG. 35).

When the projections to be restricted 42c and 42c ride over the restriction portions 51 and 51, one or both of the projections to be restricted 42c and 42c and the restriction portions 51 and 51 are elastically deformed and then elastically restored. With the movement of the end portion 42d to the lock space 29b, the movement of the operation lever 16A from the lock space 29b to the non-lock space 29a side is restricted by the restriction portions 51 and 51, and the end portion 42d is held in the lock space 29b.

In the state where the operation lever 16A has the end portion 42d held in the lock space 29b, the movement in the R2 direction in the circumferential direction is restricted by the restriction portions 51 and 51, and the movement of the operation lever 16A is restricted, so the movement of the actuation lever 15 in the R2 direction is also restricted.

With the restriction of the movement of the actuation lever 15 in the R2 direction, the state in which the barrier 6 keeps the opening 27a of the support base 14 opened is held even in a state where the user releases the finger, which has operated the operation lever 16A, from the operation lever 16A.

Meanwhile, when the operation lever 16A is operated from the lock space 29b to the non-lock space 29a and the operation lever 16A is unlocked in the state where the operation lever 16A is locked by the restriction portions 51 and 51, the first blades 43 and 43, the second blades 44 and 44, and the third blades 45 and 45 are rotated in the directions approaching each other by the biasing forces of the biasing springs 26 and 26, and the barrier 6 reaches the closing position again.

In this way, in the second configuration example, the operation lever 16A is operated in the same direction as the moving direction of the actuation lever 15, and the operation lever 16A is locked.

Therefore, the operating direction to lock the operation lever 16A is the same as the operating direction of the operation lever 16A to move the barrier 6 from the opening position to the closing position, and the locking of the operation lever 16A and the opening of the opening 27a are simultaneously performed by the operation for the operation lever 16A in the same direction. Therefore, the locking of the operation lever 16A and the opening of the opening 27a can be performed by an easy and prompt operation.

Next, a third configuration example will be described (see FIGS. 36 to 38).

In the third configuration example, an operation lever 16B is provided in place of the operation lever 16. The operation lever 16B has a columnar operation portion 52, leg portions 53 and 53 respectively projecting rearward from an outer peripheral portion of the operation portion 52, and a shaft portion 54 projecting rearward from a center portion of the operation portion 52. At a rear end portion of the leg portion 53, a projection to be restricted 53a projecting outward is provided. A compression coil spring 55 is supported by the shaft portion 54 of the operation lever 16B.

The operation lever 16B is integrally moved with the actuation lever 15 in the longitudinal direction of a sliding portion 36B. The operation lever 16B is movably supported in the front-rear direction by the actuation lever 15 and is restricted in excessive forward movement to the actuation lever 15 by a restriction portion (not illustrated). The operation lever 16B is configured to be pressed from the front, to have rearward movement and forward movement alternately performed each time the pressing operation is performed, and to be respectively rotated by predetermined angles around a shaft of the shaft portion 54 when the rearward movement and the forward movement are performed.

A support base 27B is provided with lever restriction portions 56 and 56. A slit (not illustrated) through which the shaft portion 54 passes when the operation lever 16B is moved is formed in one lever restriction portion 56, for example.

A shaft insertion hole 36a is formed in the sliding portion 36B.

The operation lever 16B has the shaft portion 54 located right in front of the shaft insertion hole 36a.

An action hole 29B is formed in place of the action hole 29 in the support surface portion 27B of the support base 14, and the action hole 29B is formed in a gentle arc shape extending in the circumferential direction.

Figure 36:
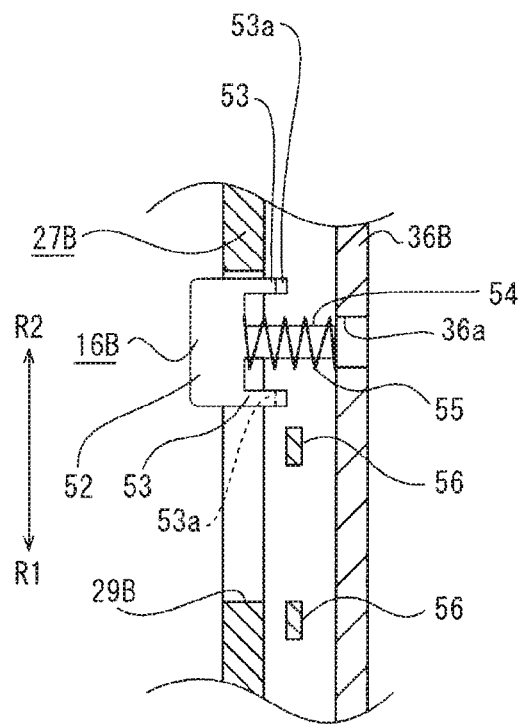
FIG. 36 is a cross-sectional view illustrating a state before the operation lever is operated in a third configuration example.

The operation lever 16B is located in an end portion in the R2 direction of the action hole 29B in a state before operated (see FIG. 36).

Figure 37:
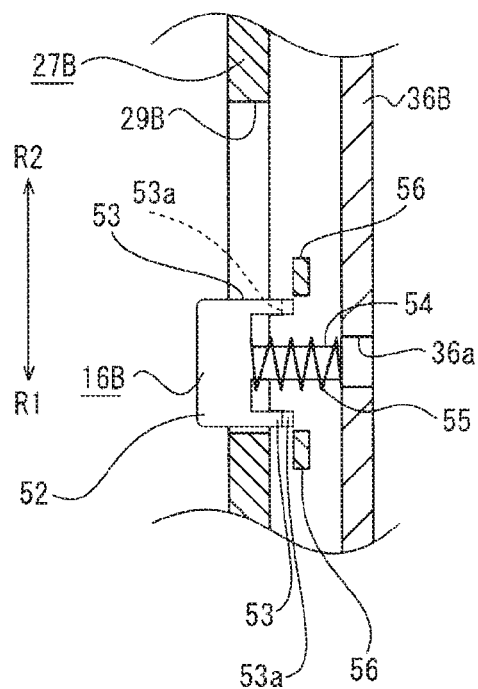
FIG. 37 is a cross-sectional view illustrating a state in which the operation lever is operated in the third configuration example.

When the operation lever 16B is operated in the R1 direction, the actuation lever 15 and the operation lever 16B are integrally moved in the R1 direction with respect to the support base 14, and the operation lever 16B is moved to an end portion in the R1 direction of the action hole 29B (see FIG. 37). When the operation lever 16B is moved to the end portion in the R1 direction of the action hole 29B, the shaft portion 54 passes through the slit in the lever restriction portion 56, for example. When the operation lever 16B is moved to the end portion in the R1 direction of the action hole 29B, the barrier 6 reaches the opening position.

Next, the operation lever 16B is pressed from the front. When the operation lever 16B is pressed, the operation lever 16B is moved rearward while being rotated around the shaft, and the projections to be restricted 53a and 53a are respectively located right behind the lever restriction portions 56 and 56 and the shaft portion 54 is inserted into the shaft insertion hole 36a of the actuation lever 15. When the operation lever 16B is moved rearward while being rotated and the shaft portion 54 is inserted into the shaft insertion hole 36a, the compression coil spring 55 is compressed between a rear surface of the operation portion 52 and a front-side opening edge of the shaft insertion hole 36a, and a forward biasing force larger than the biasing force before the rearward movement is given to the operation lever 16B by the compression coil spring 55.

Figure 38:
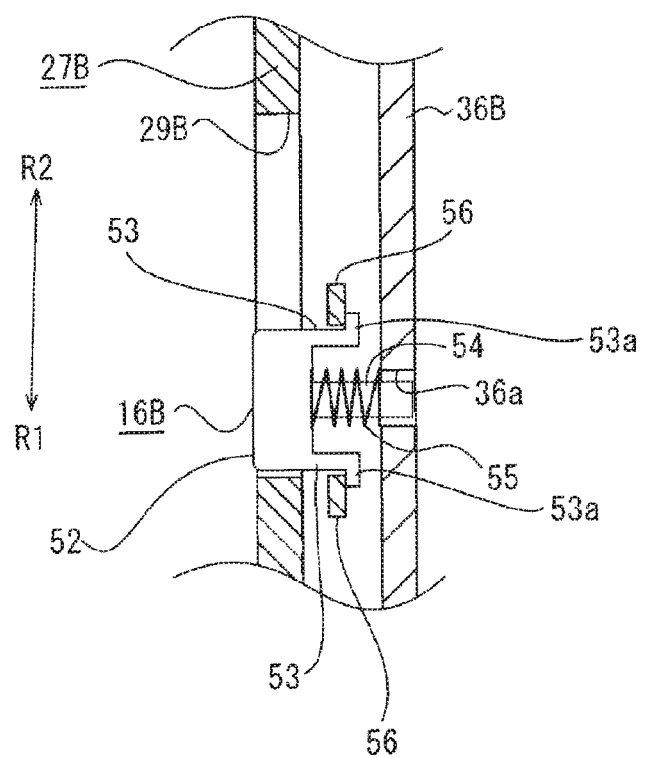
FIG. 38 is a cross-sectional view illustrating a state in which the operation lever is locked in the third configuration example.

Therefore, when the pressing operation for the operation lever 16B is released, the projections to be restricted 53a and 53a are respectively pushed against the lever restriction portions 56 and 56 from the rear by the biasing force of the compression coil spring 55, and the operation lever 16B is locked by the lever restriction portions 56 and 56 (see FIG. 38).

With the locking of the operation lever 16B by the lever restriction portions 56 and 56, the barrier 6 is held at the opening position for opening the opening 27a of the support base 14 even in a state where the user releases the finger, which has operated the operation lever 16B, from the operation lever 16B.

Meanwhile, when the operation lever 16B is pressed again in the state where the operation lever 16B is locked by the lever restriction portions 56 and 56, the operation lever 16B is rotated and engagement of the projections to be restricted 53a and 53a with the lever restriction portions 56 and 56 is disengaged, and the operation lever 16B is moved to the original position before locked by the biasing force by the compression coil spring 55.

Next, the operation lever 16B is operated in the R2 direction and returns to the state before moved and operated to the end portion in the R2 direction of the action hole 29B.

In this way, in the third configuration example, the locked state and the unlocked state are alternately set by the pressing of the operation lever 16B.

Therefore, locking and unlocking of the operation lever 16B can be performed by an easy and prompt operation.

Next, a fourth configuration example will be described (see FIGS. 39 to 41).

In the fourth configuration example, an operation lever 16C is provided in place of the operation lever 16. The operation lever 16C has a disk-like operation portion 57 and a projection to be restricted 58 projecting outward from an outer peripheral portion of the operation portion 57. The operation portion 57 is provided with a knob portion 57a projecting forward.

The operation lever 16C is integrally moved with the actuation lever 15 in the longitudinal direction of a sliding portion 36C. The operation lever 16C is rotatably supported around a shaft of the operation portion 57 by the actuation lever 15.

A lever restriction portion 59 protruding rearward is provided on a rear surface of a support surface portion 27C of the support base 14. A restriction portion 60 that is a groove portion opening rearward and to an action hole 29C side is formed adjacent to the lever restriction portion 59 on the support surface portion 27C. The action hole 29C is formed in a gentle arc shape extending in the circumferential direction.

Figure 39:
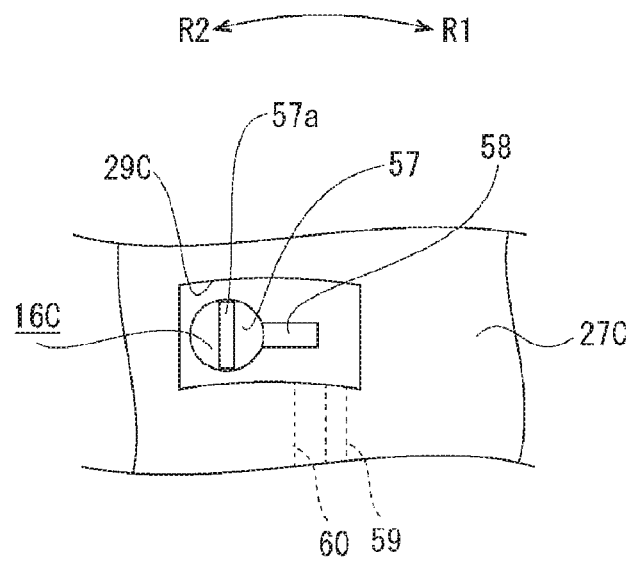
FIG. 39 is a plan view illustrating a state before the operation lever is operated in a fourth configuration example.

The operation lever 16C is located in an end portion in the R2 direction of the action hole 29C in a state before operated (see FIG. 39). At this time, the operation lever 16C is held at a rotational position where the projection to be restricted 58 projects in the longitudinal direction of the action hole 29C.

Figure 40:
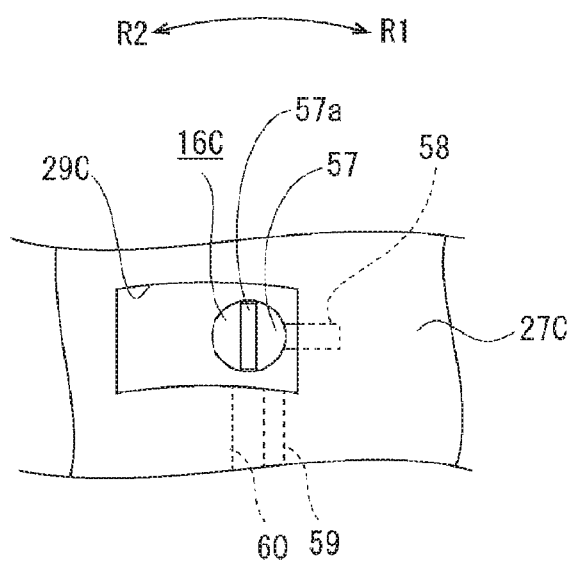
FIG. 40 is a plan view illustrating a state in which the operation lever is operated in the fourth configuration example.
Figure 41:
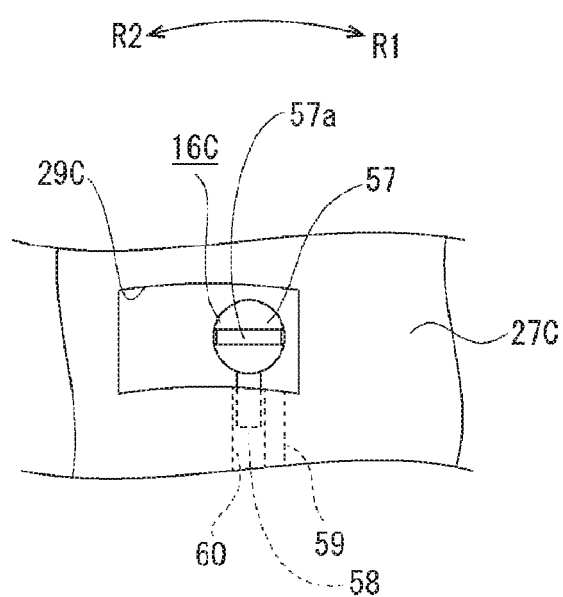
FIG. 41 is a plan view illustrating a state in which the operation lever is locked in the fourth configuration example.

When the operation lever 16C is operated in the R1 direction, the actuation lever 15 and the operation lever 16C are integrally moved in the R1 direction with respect to the support base 14, and the operation lever 16C is moved to an end portion in the R1 direction of the action hole 29C (see FIG. 40). With the movement of the operation lever 16C to the end portion in the R1 direction of the action hole 29C, the barrier 6 reaches the opening position.

Next, the operation lever 16C is rotated. The rotation operation of the operation lever 16C is performed by, for example, by gripping the knob portion 57a. When the operation lever 16C is rotated, the projection to be restricted 58 rides over the lever restriction portion 59 and is inserted into the restriction portion 60, and the operation lever 16C is locked by the restriction portion 60 (see FIG. 41). When the projection to be restricted 58 rides over the restriction projection 59, one or both of the projection to be restricted 58 and the restriction projection 59 are elastically deformed and then elastically restored.

With the locking of the operation lever 16C by the restriction portion 60, the barrier 6 is held at the opening position for opening the opening 27a of the support base 14 even in a state where the user releases the finger, which has operated the operation lever 16C, from the operation lever 16C.

Meanwhile, when the operation lever 16C is rotated in an opposite direction to the above direction in the state where the operation lever 16C is locked by the restriction portion 60, engagement of the projection to be restricted 58 with the restriction portion 60 is disengaged, and the operation lever 16B is rotated to the original position before rotated.

Next, the operation lever 16C is operated in the R2 direction and returns to the state before moved and operated to the end portion in the R2 direction of the action hole 29C.

In this way, in the fourth configuration example, the locked state and the unlocked state are set by the rotation operation of the operation lever 16C.

Therefore, locking and unlocking of the operation lever 16C can be performed by an easy and prompt operation.

Note that, in the imaging device 1, as another configuration example, a configuration in which the barrier 6 is moved from the closing position as the operation lever is pressed, and the operation lever is locked as the operation lever is further pressed and the barrier 6 is moved to the opening position may be used, for example.

Furthermore, in the imaging device 1, as still another configuration example, a configuration in which the barrier 6 is moved between the closing position and the opening position as the operation lever is rotated, and the operation lever is locked as the operation lever is further rotated and the barrier 6 is moved to the opening position may be used, for example.

<Others>

In the above description, an example in which the barrier 6 is configured by the total of six blades of the first blades 43 and 43, the second blades 44 and 44, and the third blades 45 and 45 has been described. However, the configuration of the barrier is not limited to the configuration with six blades, and the number of blades is arbitrary. For example, the barrier may be configured by a few blades such as one or two.

Figure 42:
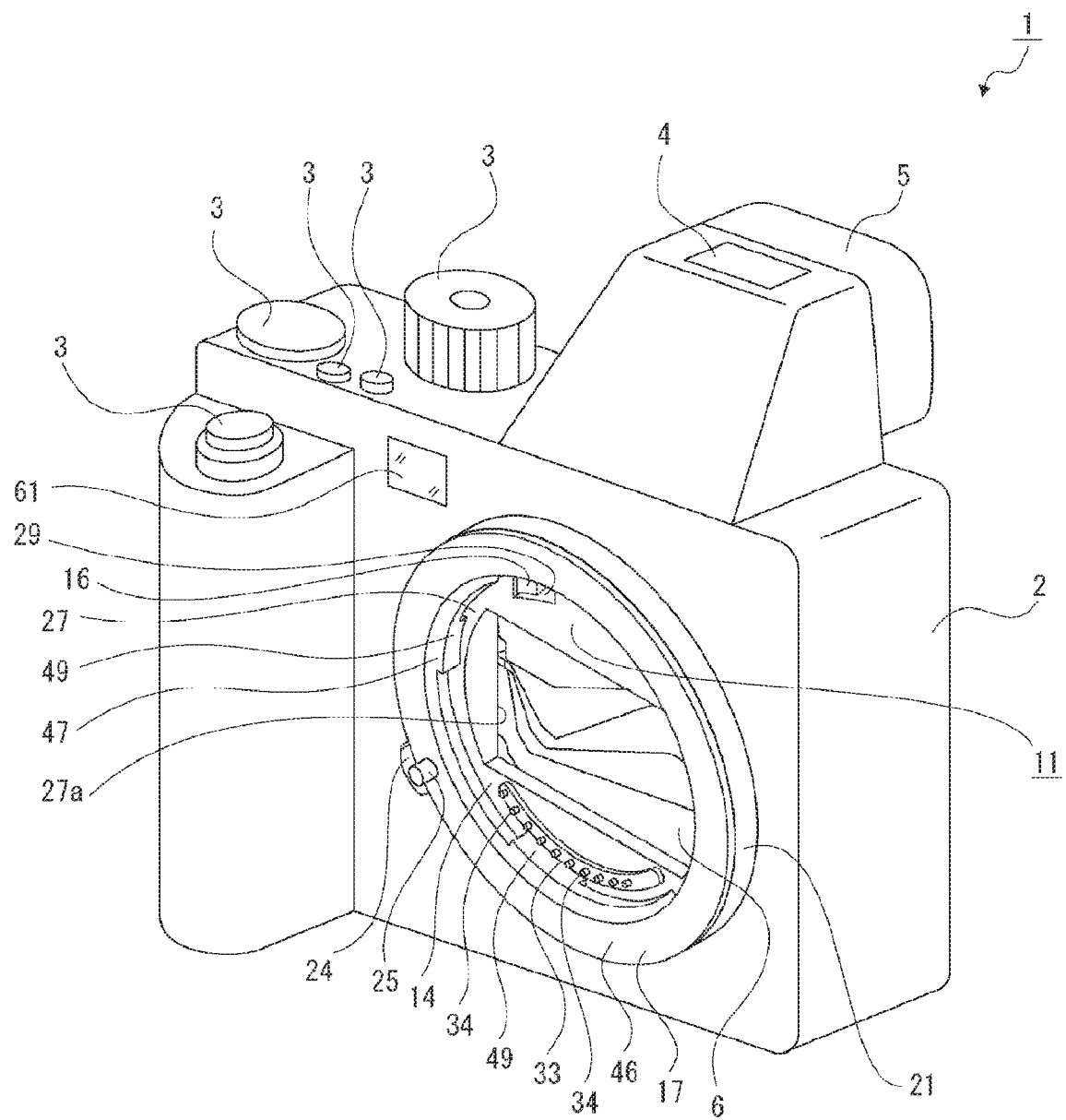
FIG. 42 is a perspective view illustrating an example of an imaging device provided with a mode display unit.

Furthermore, in the imaging device 1, a mode display portion 61 for displaying a current setting mode may be provided on the front portion of the casing 2 (see FIG. 42), for example. For example, the locked state of the operation lever 16 (16A, 16B, or 16C) is detected by a sensor, and the mode display portion 61 can be displayed in first color or display indicating the locked state can be performed in a case where the operation lever 16 is in the locked state, and the mode display portion 61 can be displayed in second color or display indicating the unlocked state can be performed in a case where the operation lever 16 is in the unlocked state.

With such a display state of the mode display portion 61, the user can recognize the current setting mode from the outside of the imaging device 1, and improvement of the usability of the imaging device 1 can be achieved. In particular, in the state where the interchangeable lens 100 is attached to the mounting portion 17, the user cannot recognize the opening/closing state (moving state) of the barrier 6 from the outside of the imaging device 1. Therefore, with the provision of the mode display portion 61, the user can recognize the opening/closing state of the barrier 6 by the current setting mode from the outside of the imaging device 1 even in the state where the interchangeable lens 100 is attached to the mounting portion 17.

<One Embodiment of Imaging Device>

Figure 43:
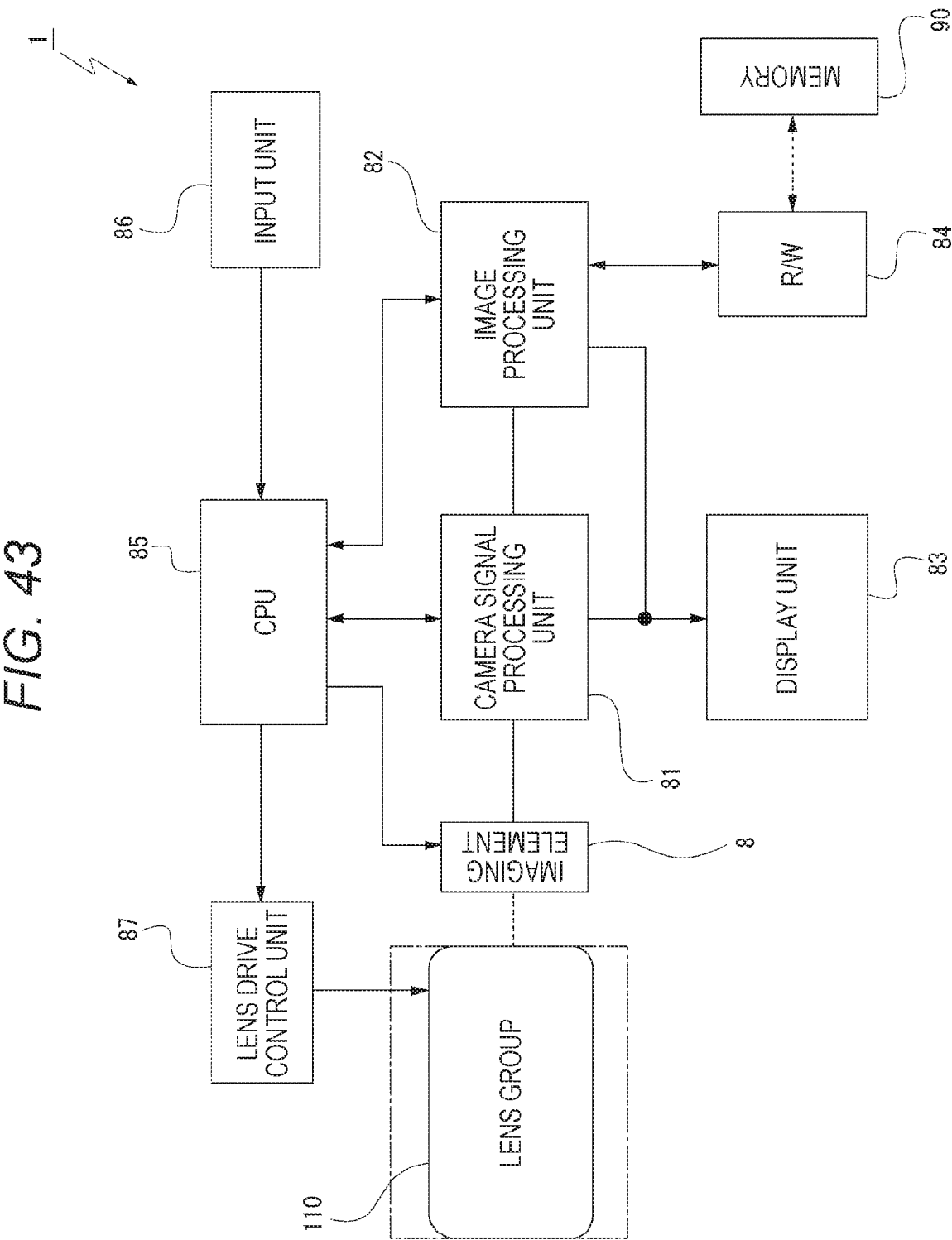
FIG. 43 is a block diagram of the imaging device.

Hereinafter, a block diagram of a still camera according to an embodiment of the imaging device according to the present technology is illustrated (see FIG. 43).

The imaging device 1 includes an imaging element 8 having a photoelectric conversion function to convert taken light into an electrical signal, a camera signal processing unit 81 that performs signal processing such as analog-digital conversion for a captured image signal, and an image processing unit 82 that performs recording reproduction processing for the image signal. Furthermore, the imaging device 1 includes a display unit 83 (display) that displays a captured image and the like, a reader/writer (R/W) 84 that writes and reads the image signal to a memory 90, a central processing unit (CPU) 85 that controls the entire imaging device 1, an input unit 86 (input units 3, 3, and the like) such as various switches for which required operations are performed by the user, and a lens drive control unit 87 that controls driving of a lens group 110 provided in the interchangeable lens 100.

The camera signal processing unit 81 performs various kinds of signal processing such as conversion of an output signal from the imaging element 8 into a digital signal, noise removal, image quality correction, conversion to luminance/color difference signals, and the like.

The image processing unit 82 performs compression encoding/decompression decoding processing for the image signal based on a predetermined image data format, conversion processing for data specification such as resolution, and the like.

The display unit 83 has a function to display various kinds of data such as an operation state of the user for the input unit 86 and the captured image.

The R/W 84 writes image data coded by the image processing unit 82 into the memory 90 and reads image data recorded in the memory 90.

The CPU 85 functions as a control processing unit that controls each circuit block provided in the imaging device 1 and controls each circuit block on the basis of an instruction input signal or the like from the input unit 86.

The input unit 86 outputs an instruction input signal corresponding to the operation by the user to the CPU 85.

The lens drive control unit 87 controls a motor (not illustrated) or the like that drives the lens group 110 on the basis of a control signal from the CPU 85.

The memory 90 is, for example, a semiconductor memory attachable to and detachable from a slot connected to the R/W 84.

Hereinafter, an operation of the imaging device 1 will be described below.

In a capture standby state, the captured image signal is output to the display unit 83 via the camera signal processing unit 81 and displayed as a camera through image, under the control of the CPU 85. Furthermore, when the instruction input signal for zooming is input from the input unit 86, the CPU 85 outputs the control signal to the lens drive control unit 87, and a predetermined lens group 110 is moved on the basis of control of the lens drive control unit 87.

When capture is performed according to the instruction input signal from the input unit 86, the captured image signal is output from the camera signal processing unit 81 to the image processing unit 82, undergoes the compression encoding processing, and is converted into digital data in a predetermined data format. The converted data is output to the R/W 84 and written in the memory 90.

Focusing is performed by moving the predetermined lens group 110 by the lens drive control unit 87 on the basis of the control signal from the CPU 85.

In a case of reproducing image data recorded in the memory 90, predetermined image data is read from the memory 90 by the R/W 84 in response to the operation to the input unit 86, the decompression decoding processing is performed by the image processing unit 82, and then a reproduced image signal is output to the display unit 83 and a reproduced image is displayed.

<Present Technology>

The present technology can also have the following configurations.

(1)

An imaging device including:

an annular mounting portion to which an accessory is attachable;

an imaging element that receives object light taken through an opening;

a barrier moved between a closing position for closing the opening and an opening position for opening the opening;

a portion to be acted that moves the barrier with an attaching action of the accessory to the mounting portion; and an operation portion that moves the barrier regardless of the attaching action of the accessory to the mounting portion, in which the operation portion is located inside the mounting portion or at a front portion of the mounting portion.

(2)

The imaging device according to (1), in which a restriction portion that restricts an operation of the operation portion to disable the movement of the barrier is provided.

(3)

The imaging device according to (2), in which the barrier is held at the opening position by the restriction of the operation of the operation portion by the restriction portion.

(4)

The imaging device according to any one of (1) to (3), in which an actuation lever including the portion to be acted and moved with the attaching action of the accessory is provided.

(5)

The imaging device according to (4), in which a support base that movably supports the actuation lever is provided, a restriction portion that restricts an operation of the operation portion to disable the movement of the barrier is provided, and the restriction portion is provided in the support base.

(6)

The imaging device according to any one of (1) to (5), in which the operation portion exists at a position not in contact with the accessory at time of attachment or detachment of the accessory with respect to the mounting portion.

(7)

The imaging device according to (4) or (5), in which an operation lever including the operation portion is provided, and the operation lever is supported by the actuation lever.

(8)

An imaging device including:

an annular mounting portion to which an accessory is attachable;

an imaging element that receives object light taken through an opening;

a barrier moved between a closing position for closing the opening and an opening position for opening the opening;

an operation portion that moves the barrier regardless of an attaching action of the accessory to the mounting portion; and a restriction portion that restricts an operation of the operation portion to disable the movement of the barrier, in which the operation portion is located inside the mounting portion or at a front portion of the mounting portion.

(9)

The imaging device according to (8), in which a portion to be acted that moves the barrier with the attaching action of the accessory to the mounting portion is provided.

(10)

The imaging device according to (9), in which an actuation lever including the portion to be acted and moved with the attaching action of the accessory is provided.

(11)

The imaging device according to (10), in which a support base that movably supports the actuation lever is provided, and the restriction portion is provided in the support base.

(12)

The imaging device according to (10) or (11), in which an operation lever including the operation portion is provided, and the operation lever is supported by the actuation lever.

(13)

The imaging device according to any one of (8) to (12), in which the barrier is held at the opening position by the restriction of the operation of the operation portion by the restriction portion.

(14)

The imaging device according to any one of (8) to (13), in which the operation portion exists at a position not in contact with the accessory at time of attachment or detachment of the accessory with respect to the mounting portion.

(15)

An imaging device including:

an annular mounting portion to which an accessory is attachable;

an imaging element that receives object light taken through an opening;

a barrier moved between a closing position for closing the opening and an opening position for opening the opening; and an operation portion that moves the barrier regardless of an attaching action of the accessory to the mounting portion, in which the operation portion is located inside the mounting portion or at a front portion of the mounting portion at a position not in contact with the accessory at time of attachment or detachment of the accessory with respect to the mounting portion.

(16)

The imaging device according to (15), in which a restriction portion that restricts an operation of the operation portion to disable the movement of the barrier is provided.

(17)

The imaging device according to (16), in which the barrier is held at the opening position by the restriction of the operation of the operation portion by the restriction portion.

(18)

The imaging device according to any one of (15) to (17), in which a portion to be acted that moves the barrier with the attaching action of the accessory to the mounting portion is provided.

(19)

The imaging device according to (18), in which an actuation lever including the portion to be acted and moved with the attaching action of the accessory is provided.

(20)

The imaging device according to (19), in which
a restriction portion that restricts an operation of the operation portion to disable the movement of the barrier is provided,
a support base that movably supports the actuation lever is provided, and
the restriction portion is provided in the support base.

(21)

The imaging device according to (19) or (20), in which
an operation lever including the operation portion is provided, and
the operation lever is supported by the actuation lever.

REFERENCE SIGNS LIST

1 Imaging device
6 Barrier
8 Imaging element
14 Support base
15 Actuation lever
16 Operation lever
17 Mounting portion
27a Opening
32 Restriction portion
42 Operation portion
100 Interchangeable lens (accessory)
16A Operation lever
37 Portion to be acted
42A Operation portion
51 Restriction portion
16B Operation lever
52 Operation portion
56b Restriction portion
16C Operation lever
57 Operation portion
60 Restriction portion

The invention claimed is:

1. An imaging device, comprising:
an annular mounting portion to which an accessory is attachable;
an imaging element configured to receive object light through an opening;
a barrier movable between a closing position to close the opening and an opening position to open the opening;
a portion that moves the barrier with an attaching action of the accessory to the annular mounting portion;
an operation portion that moves the barrier regardless of the attaching action of the accessory to the annular mounting portion, wherein the operation portion is located one of inside the annular mounting portion or at a front portion of the annular mounting portion; and
a restriction portion that restricts an operation of the operation portion to disable the movement of the barrier.

2. The imaging device according to claim 1, wherein the barrier is held at the opening position by the restriction of the operation of the operation portion by the restriction portion.

3. The imaging device according to claim 1, further comprising an actuation lever that includes the portion, wherein the actuation lever is moved with the attaching action of the accessory.

4. The imaging device according to claim 3, further comprising
a support base that movably supports the actuation lever, wherein the support base includes the restriction portion.

5. The imaging device according to claim 1, wherein the operation portion is at a position not in contact with the accessory at time of one of attachment or detachment of the accessory with respect to the annular mounting portion.

6. The imaging device according to claim 3, further comprising an operation lever that includes the operation portion wherein the operation lever is supported by the actuation lever.

7. An imaging device, comprising:
an annular mounting portion to which an accessory is attachable;
an imaging element configured to receive object light through an opening;
a barrier movable between a closing position to close the opening and an opening position to open the opening;
an operation portion that moves the barrier regardless of an attaching action of the accessory to the annular mounting portion; and
a restriction portion that restricts an operation of the operation portion to disable the movement of the barrier, wherein
the operation portion is located one of inside the annular mounting portion or at a front portion of the annular mounting portion.

8. The imaging device according to claim 7, further comprising a portion that moves the barrier with the attaching action of the accessory to the annular mounting portion.

9. The imaging device according to claim 8, further comprising an actuation lever including that includes the portion, wherein the actuation lever is moved with the attaching action of the accessory.

10. The imaging device according to claim 9, further comprising a support base that movably supports the actuation lever, wherein the support base includes the restriction portion.

11. The imaging device according to claim 9, further comprising an operation lever that includes the operation portion, wherein the operation lever is supported by the actuation lever.

12. The imaging device according to claim 7, wherein the barrier is held at the opening position by the restriction of the operation of the operation portion by the restriction portion.

13. The imaging device according to claim 7, wherein the operation portion is at a position not in contact with the accessory at time of one of attachment or detachment of the accessory with respect to the annular mounting portion.

14. An imaging device, comprising:
an annular mounting portion to which an accessory is attachable;
an imaging element configured to receive object light through an opening;
a barrier movable between a closing position to close the opening and an opening position to open the opening;
an operation portion that moves the barrier regardless of an attaching action of the accessory to the annular mounting portion, wherein the operation portion is located one of inside the annular mounting portion or at a front portion of the annular mounting portion, and the operation portion is at a position not in contact with the accessory at time of one of attachment or detachment of the accessory with respect to the annular mounting portion; and
a restriction portion that restricts an operation of the operation portion to disable the movement of the barrier.

15. The imaging device according to claim 14, wherein the barrier is held at the opening position by the restriction of the operation of the operation portion by the restriction portion.

16. The imaging device according to claim 14, further comprising a portion that moves the barrier with the attaching action of the accessory to the annular mounting portion.

17. The imaging device according to claim 16, further comprising an actuation lever that includes the portion, wherein the actuation lever is moved with the attaching action of the accessory.

18. The imaging device according to claim 17, further comprising
    a support base that movably supports the actuation lever, wherein the support base includes the restriction portion.

19. The imaging device according to claim 17, further comprising an operation lever including the operation portion, wherein the operation lever is supported by the actuation lever.

\* \* \* \* \*